United States Patent
Nagamine et al.

(10) Patent No.: US 7,330,424 B2
(45) Date of Patent: Feb. 12, 2008

(54) NODE DEVICE IN NETWORK, AND NETWORK SYSTEM

(75) Inventors: Kazuaki Nagamine, Kawasaki (JP); Kazuhiko Shiba, Kawasaki (JP); Toru Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 878 days.

(21) Appl. No.: 10/015,371

(22) Filed: Dec. 12, 2001

(65) Prior Publication Data

US 2003/0026272 A1    Feb. 6, 2003

(30) Foreign Application Priority Data

Aug. 2, 2001    (JP) ............... 2001-235507

(51) Int. Cl.
  *G01R 31/08* (2006.01)
(52) U.S. Cl. ...................... 370/217; 370/258
(58) Field of Classification Search ............... 370/258, 370/222–224, 404, 424
  See application file for complete search history.

(56) References Cited

U.S. PATENT DOCUMENTS

| | | | |
|---|---|---|---|
| 5,515,367 A * | 5/1996 | Cox et al. .................. 370/404 |
| 5,561,766 A * | 10/1996 | Kitamori .................. 714/43 |
| 6,061,335 A * | 5/2000 | De Vito et al. ............. 370/258 |
| 6,587,974 B1 * | 7/2003 | Majd et al. ................ 714/56 |
| 6,870,813 B1 * | 3/2005 | Raza et al. ................ 370/238 |
| 2002/0135835 A1 * | 9/2002 | Lauder et al. ............. 359/124 |
| 2003/0035411 A1 * | 2/2003 | Moy et al. ................. 370/352 |
| 2003/0152027 A1 * | 8/2003 | Takagi ....................... 370/222 |
| 2003/0215231 A1 * | 11/2003 | Weston-Dawkes et al. ... 398/19 |
| 2006/0098660 A1 * | 5/2006 | Pal et al. ................. 370/395.51 |

FOREIGN PATENT DOCUMENTS

WO     WO 92/04787     3/1992
WO     WO0074310   *   7/2000

OTHER PUBLICATIONS

Towster et al. (Self-Healing Ring Networks: Gateway to Public Information Networking; IEEE Jun. 1990).*

(Continued)

*Primary Examiner*—Edan Orgad
*Assistant Examiner*—Salman Ahmed
(74) *Attorney, Agent, or Firm*—Katten Muchin Rosenman LLP

(57) ABSTRACT

The present invention provides a node device for connecting a plurality of networks. The node device comprises a plurality of input units for respectively inputting data from first transmission lines installed in each of the networks, a plurality of output units for respectively outputting data to second transmission lines installed in each of the networks, and a switching unit for switching the data input from the input units to the output units. The input unit that inputs data from a transmission line shared by the networks among the first transmission lines has a higher transmission speed than other input units.

9 Claims, 27 Drawing Sheets

OTHER PUBLICATIONS

Ahmed et al.(A Scheme for High-Performance LAN Interconnection Across Public MAN's; IEEE, 1993).*
Reuven et al. (A New Label-Based Source Routing for Multi-Ring Networks; IEEE 1995).*
Nederlof et al. (End-to- End Survivable Broadband Networks; IEEE, Sep. 1995).*
Wilson (A tale of two rings; Telephony v225n18 pp. 36-44; Nov. 1, 1993).□□.*
Grover (High Availability Path Design in Ring-Based Optical Networks; IEEE 1999).*
Proestaki (Impact of Topology on Wavelength and Switch-Port Requirements in All-Optical□□Hierarchical Multi-Ring Networks; Global Telecommunications Conference-Globecom '99).*
Proestaki (Design and dimensioning of dual-homing hierarchical multi-ring networks; IEE Apr. 2000).*

* cited by examiner

FIG. 6A

| | K1 | K2 |
|---|---|---|
| | L1 | |
| 1a | NR/B | A/S/IDLE |
| 1b | NR/D | A/S/IDLE |
| 2a | NR/C | B/S/IDLE |
| 2b | NR/A | B/S/IDLE |
| 3a | NR/D | C/S/IDLE |
| 3b | NR/B | C/S/IDLE |
| 4a | NR/A | D/S/IDLE |
| 4b | NR/C | D/S/IDLE |

FIG. 6B

| | K1 | K2 |
|---|---|---|
| | L5 | |
| 1A | NR/E | F/S/IDLE |
| 1B | NR/D | F/S/IDLE |
| 2A | NR/C | E/S/IDLE |
| 2B | NR/F | E/S/IDLE |
| 3A | NR/D | C/S/IDLE |
| 3B | NR/E | C/S/IDLE |
| 4A | NR/F | D/S/IDLE |
| 4B | NR/C | D/S/IDLE |

FIG. 10

|     | K1   | K2       |
|-----|------|----------|
| 1a  | NR/B | A/S/IDLE |
| 1b  | NR/D | A/S/IDLE |
| 2a  | NR/C | B/S/IDLE |
| 2b  | NR/A | B/S/IDLE |
| 3a  | NR/D | C/S/IDLE |
| 3b  | NR/B | C/S/IDLE |
| 4a  | NR/A | D/S/IDLE |
| 4b  | NR/C | D/S/IDLE |

|     | K1   | K2       |
|-----|------|----------|
| 1A  | NR/E | F/S/IDLE |
| 1B  | NR/D | F/S/IDLE |
| 2A  | NR/C | E/S/IDLE |
| 2B  | NR/F | E/S/IDLE |
| 3A  | NR/D | C/S/IDLE |
| 3B  | NR/E | C/S/IDLE |
| 4A  | NR/F | D/S/IDLE |
| 4B  | NR/C | D/S/IDLE |

|     | K1     | K2         |
|-----|--------|------------|
| 8a  | SF-R/A | D/S/RDI    |
| 8b  | SF-R/A | D/L/IDLE   |
| 9a  | SF-R/D | A/S/RDI    |
| 9b  | SF-R/D | A/L/IDLE   |
| 10a | RR-R/A | D/S/Br&Sw  |
| 10b | SF-R/A | D/L/Br&Sw  |
| 11a | RR-R/D | A/S/Br&Sw  |
| 11b | SF-R/D | A/L/Br&Sw  |
| 12a | WTR/A  | D/S/Br&Sw  |
| 12b | WTR/A  | D/L/Br&Sw  |
| 12c | RR-R/A | D/S/Br&Sw  |
| 13a | WTR/D  | A/S/Br&Sw  |
| 13b | WTR/D  | A/L/Br&Sw  |
| 13c | RR-R/D | A/S/Br&Sw  |
| 14a | NR/A   | D/S/Br     |
| 14b | NR/A   | D/L/Br     |
| 15a | NR/D   | A/S/Br     |
| 15b | NR/D   | A/L/Br     |

FIG. 14

| | K1 | K2 |
|---|---|---|
| 1a | NR/B | A/S/IDLE |
| 1b | NR/D | A/S/IDLE |
| 2a | NR/C | B/S/IDLE |
| 2b | NR/A | B/S/IDLE |
| 3a | NR/D | C/S/IDLE |
| 3b | NR/B | C/S/IDLE |
| 4a | NR/A | D/S/IDLE |
| 4b | NR/C | D/S/IDLE |

| | K1 | K2 |
|---|---|---|
| 1A | NR/E | F/S/IDLE |
| 1B | NR/D | F/S/IDLE |
| 2A | NR/C | E/S/IDLE |
| 2B | NR/F | E/S/IDLE |
| 3A | NR/D | C/S/IDLE |
| 3B | NR/E | C/S/IDLE |
| 4A | NR/F | D/S/IDLE |
| 4B | NR/C | D/S/IDLE |

| | K1 | K2 |
|---|---|---|
| 16a | SF-R/D | C/S/RDI |
| 16b | SF-R/D | C/L/IDLE |
| 17a | SF-R/C | D/S/RDI |
| 17b | SF-R/C | D/L/IDLE |
| 18a | RR-R/D | C/S/Br&Sw |
| 18b | SF-R/D | C/L/Br&Sw |
| 19a | RR-R/C | D/S/Br&Sw |
| 19b | SF-R/C | D/L/Br&Sw |
| 20a | WTR/D | C/S/Br&Sw |
| 20b | WTR/D | C/L/Br&Sw |
| 20c | RR-R/D | D/S/Br&Sw |
| 21a | WTR/C | D/L/Br&Sw |
| 21b | WTR/C | D/S/Br&Sw |
| 21c | RR-R/C | D/L/Br&Sw |
| 22a | NR/D | C/S/Br |
| 22b | NR/D | C/L/Br |
| 23a | NR/C | D/S/Br |
| 23b | NR/C | D/L/Br |

| | K1 | K2 |
|---|---|---|
| 8A | SF-R/C | D/S/RDI |
| 8B | SF-R/C | D/L/IDLE |
| 9A | SF-R/D | C/S/RDI |
| 9B | SF-R/D | C/L/IDLE |
| 10A | RR-R/C | D/S/Br&Sw |
| 10B | SF-R/C | D/L/Br&Sw |
| 11A | RR-R/D | C/S/Br&Sw |
| 11B | SF-R/D | C/L/Br&Sw |
| 12A | WTR/C | D/S/Br&Sw |
| 12B | WTR/C | D/L/Br&Sw |
| 12C | RR-R/C | D/S/Br&Sw |
| 13A | WTR/D | C/L/Br&Sw |
| 13B | WTR/D | C/S/Br&Sw |
| 13C | RR-R/D | C/L/Br&Sw |
| 14A | NR/C | D/S/Br |
| 14B | NR/C | D/L/Br |
| 15A | NR/D | C/S/Br |
| 15B | NR/D | C/L/Br |

FIG. 18

| | K1 | K2 |
|---|---|---|
| 1a | NR/B | A/S/IDLE |
| 1b | NR/D | A/S/IDLE |
| 2a | NR/C | B/S/IDLE |
| 2b | NR/A | B/S/IDLE |
| 3a | NR/D | C/S/IDLE |
| 3b | NR/B | C/S/IDLE |
| 4a | NR/A | D/S/IDLE |
| 4b | NR/C | D/S/IDLE |

| | K1 | K2 |
|---|---|---|
| 1A | NR/E | F/S/IDLE |
| 1B | NR/D | F/S/IDLE |
| 2A | NR/C | E/S/IDLE |
| 2B | NR/F | E/S/IDLE |
| 3A | NR/D | C/S/IDLE |
| 3B | NR/E | C/S/IDLE |
| 4A | NR/F | D/S/IDLE |
| 4B | NR/C | D/S/IDLE |

| | K1 | K2 |
|---|---|---|
| 24a | SF-R/C | B/S/RDI |
| 24b | SF-R/C | B/L/IDLE |
| 25a | SF-R/C | D/S/RDI |
| 25b | SF-R/C | D/L/IDLE |
| 26b | SF-R/C | B/L/Br&Sw |
| 27b | SF-R/C | D/L/Br&Sw |
| 28a | def K byte | def K byte |
| 29a | SF-R/D | C/L/IDLE |
| 30a | SF-R/B | C/L/IDLE |

| | K1 | K2 |
|---|---|---|
| 16A | SF-R/C | D/S/RDI |
| 16B | SF-R/C | D/L/IDLE |
| 17A | SF-R/C | E/S/RDI |
| 17B | SF-R/C | E/L/IDLE |
| 18B | SF-R/C | D/L/Br&Sw |
| 19B | SF-R/C | E/L/Br&Sw |
| 20A | def K byte | def K byte |
| 21A | SF-R/E | C/L/IDLE |
| 22A | SF-R/D | C/L/IDLE |

UPSR

BLSR

UPSR

BLSR

NODE DEVICE IN NETWORK, AND NETWORK SYSTEM

BACKGROUND OF THE INVENTION

1. Field of the Invention

The present invention relates to a node device installed in a network in which a plurality of node devices are connected by transmission lines, and more particularly to a node device which is used to connect a plurality of networks.

2. Description of the Related Art

Ring networks in which a plurality of node devices (hereafter referred to simply as "nodes") are connected in ring form by transmission lines such as optical fibers or the like can be divided into the two main categories of uni-directional path switched ring (UPSR) systems and bi-directional line switched ring (BLSR) systems.

FIG. 20A is a block diagram which shows the ring network construction in a UPSR system, and the manner of data transmission in such a system. FIG. 20B is a block diagram which shows the construction of the ring network in a BLSR system, and the manner of data transmission in such a system. Both diagrams show how data that is input into the node A is output from the node D.

In the UPSR system, data that is input into the node A is transmitted to both of the nodes B and C, and is sent to the node D from the nodes B and C. In the case of normal operation, the node D selects the data from the side of the node C among the data sent from the nodes B and C, and outputs this data. The data is similarly transmitted in cases where data input into the node D is output from the node A.

Meanwhile, in the BLSR system, data that is input into the node A is transmitted only to the node C, and is then output from the node D after being sent from the node C to the node D. The data is similarly transmitted in cases where data input into the node D is output from the node D. The transmission line from the node A to the node B, and the transmission line from the node B to the node D, are utilized as bypass lines (spare channels or protection channels) for use in the case of trouble, as will be described later.

FIG. 21A shows the data transmission route used in cases where trouble occurs in the transmission path in a ring network based on the UPSR system. FIG. 21B shows the data transmission route used in cases where trouble occurs in the transmission line in a ring network based on the BLSR system. In these figures, a case is shown in which trouble has occurred in the transmission line between the node C and the node D.

In the UPSR system, even under conditions in which there is no trouble in the transmission line, data that is input into the node A is sent to the node D from the node A via the node C, and is also sent to the node D from the node A via the node B. Accordingly, in cases where trouble occurs in the transmission line between the nodes C and D, data transmitted via the route of nodes A-B-D, in which no trouble has occurred, is selected by the node D. Specifically, the node D performs processing that switches data from the side of the node C to data from the side of the node D.

On the other hand, in the BLSR system, relief measures are taken by means of an APS (automatic protection switch) protocol. Specifically, data sent to the node C from the node A is bridged by the node C and returned to the node A, after which this data is sent to the node D via the node B, switched by the node D and output from the node D.

For example, if the channels used in cases where no trouble occurs (work channels) are set as channels 1 through 24, and the channels used in cases where trouble occurs (spare channels or protection channels) are set as channels 25 through 48, then data that is transmitted from the node A to the node C using the work channel 1 is output (bridged) to both the channel 1 and the spare channel 25 by the node C. The data output to the channel 1 is not transmitted to the node D because of trouble between the nodes C and D. The data output to the channel 25 is transmitted via the nodes C-A-B-D, and in the node D, this data is returned (switched) from the channel 25 to the channel 1 and output.

In cases where a larger-scale ring network is to be constructed using a ring network of the type described above, a plurality of ring networks are connected. FIG. 22 is a block diagram which shows the construction of a network system in which four ring networks L1 through L4 are connected.

A construction which has redundancy is employed in the connection parts between the ring networks, so that even in cases where trouble occurs in the transmission lines, this can be handled by means of bypass lines. For example, in cases where trouble occurs in the transmission line between the nodes D and I, a route from the node D to the node I is formed via the nodes E and H.

However, in such conventional network interconnection parts, at least four nodes are required, so that the amount of hardware is increased, and the cost is increased.

Furthermore, in transmission lines of parts surrounded by ring networks, data (traffic) that is sent from the nodes of certain ring networks to the nodes of other ring networks is transmitted; accordingly, a larger amount of data is transmitted than in transmission lines that are not surrounded.

However, in the case of conventional ring networks, it is a prerequisite that the respective transmission lines between nodes have the same bandwidth; accordingly, convergences occur that result in bottlenecks. On the other hand, if the overall bandwidth of the ring network transmission lines is increased, this leads to a state in which the bandwidth of transmission lines other than transmission lines in parts surrounded by ring networks cannot be effectively utilized.

SUMMARY OF THE INVENTION

It is an object of the present invention to suppress the increase in hardware that occurs when networks are connected to each other, and to suppress the accompanying increase in cost.

Furthermore, another object of the present invention is to prevent the convergence of traffic in cases where a plurality of networks are connected, and to utilize the bandwidth of the transmission lines in an effective manner.

Furthermore, still another object of the present invention is to provide a flexible transmission bandwidth which is matched to the state of utilization (quantity of communications) of the network channels.

The node device of the present invention is a node device for connecting a plurality of networks, said node device comprising: a plurality of input units for respectively inputting data from first transmission lines installed in each of said plurality of networks; a plurality of output units for respectively outputting data to second transmission lines installed in each of said plurality of networks; and a first switching unit for switching the data input from said input units to said output units; wherein the input unit that inputs data from a transmission line shared by said plurality of networks among said first transmission lines has a higher transmission speed than other input units.

In the first aspect of the present invention, a plurality of networks are connected by connecting a plurality of transmission lines to a plurality of input parts and output parts of a single node device. Accordingly, a plurality of networks can be connected by means of a single node device. As a result, the increase in hardware that occurs when networks are connected to each other, and the accompanying increase in cost, can be suppressed.

Furthermore, in the first aspect of the present invention, the input unit that inputs data from a transmission line shared by said plurality of networks among said first transmission lines has a higher transmission speed than other input units.

Since traffic from a plurality of networks is transmitted via shared transmission lines, convergence is avoided by increasing the transmission speed of the input unit of this transmission line, so that communications bottlenecks are eliminated.

Preferably, at least one of said input units has transmission speeds that differ from those of the other input units, and at least one of said output units has transmission speeds that differ from those of the other output units. Accordingly, by making the transmission speeds of the input units and output units which have a large quantity of traffic greater than the transmission speeds of the input units and output units which have a small quantity of traffic, the convergence of traffic in cases where a plurality of networks are connected can be prevented, and the bandwidth of the transmission lines can be effectively used.

Preferably, furthermore, the output unit that outputs data to a transmission line shared by said plurality of networks among said second transmission lines has a higher transmission speed than other output units. Since traffic from a plurality of networks is transmitted via a shared transmission line, convergence is avoided by increasing the transmission speed of the output unit of this transmission line, so that communications bottlenecks are eliminated.

In a first embodiment of the first aspect of the present invention, said plurality of networks uses bi-directional line switching, and said node device further comprises: a memory unit for storing ring construction information that indicates that said first transmission lines and said second transmission lines connect to which of said plurality of networks; a transmission unit for producing topology information, squelch information and switching information concerning each of said plurality of networks on the basis of said ring construction information for each of the corresponding networks, and transmitting said topology information, said squelch information and said switching information via said output units; and a second switching unit for performing processing including switching operations and bridging operations on the basis of said switching information.

As a result, even in cases where a plurality of networks are connected, topology information, squelch information and switching information can be transmitted for each network.

The network system according to a second aspect of the present invention comprises a first network in which a plurality of first node devices are connected by transmission lines; a second network in which a plurality of second node devices are connected by transmission lines; and a third node device which is connected to some of the transmission lines of said first network and some of the transmission lines of said second network, said third node device transmitting and receiving the data transmitted and received by at least one of said transmission lines connected to said third node device at a higher speed than the data transmitted and received by the other transmission lines of said first network and transmission lines of said second network.

The same operation and effects as those obtained in the abovementioned first aspect of the present invention can also be obtained in this second aspect of the present invention.

BRIEF DESCRIPTION OF THE PDRAWINGS

FIG. 6A shows the content of the switching information that is transmitted on the ring network L1 during normal operation;

FIG. 6B shows the content of the switching information that is transmitted on the ring network L5 during normal operation;

FIG. 10 shows the contents of the switching information in FIGS. 8A, 8B, 9A and 9B;

FIG. 14 shows the content of the switching information;

FIG. 18 shows the content of the switching information;

DESCRIPTION OF THE PREFERRED EMBODIMENTS

Overall Construction of Network System

Figure 1:
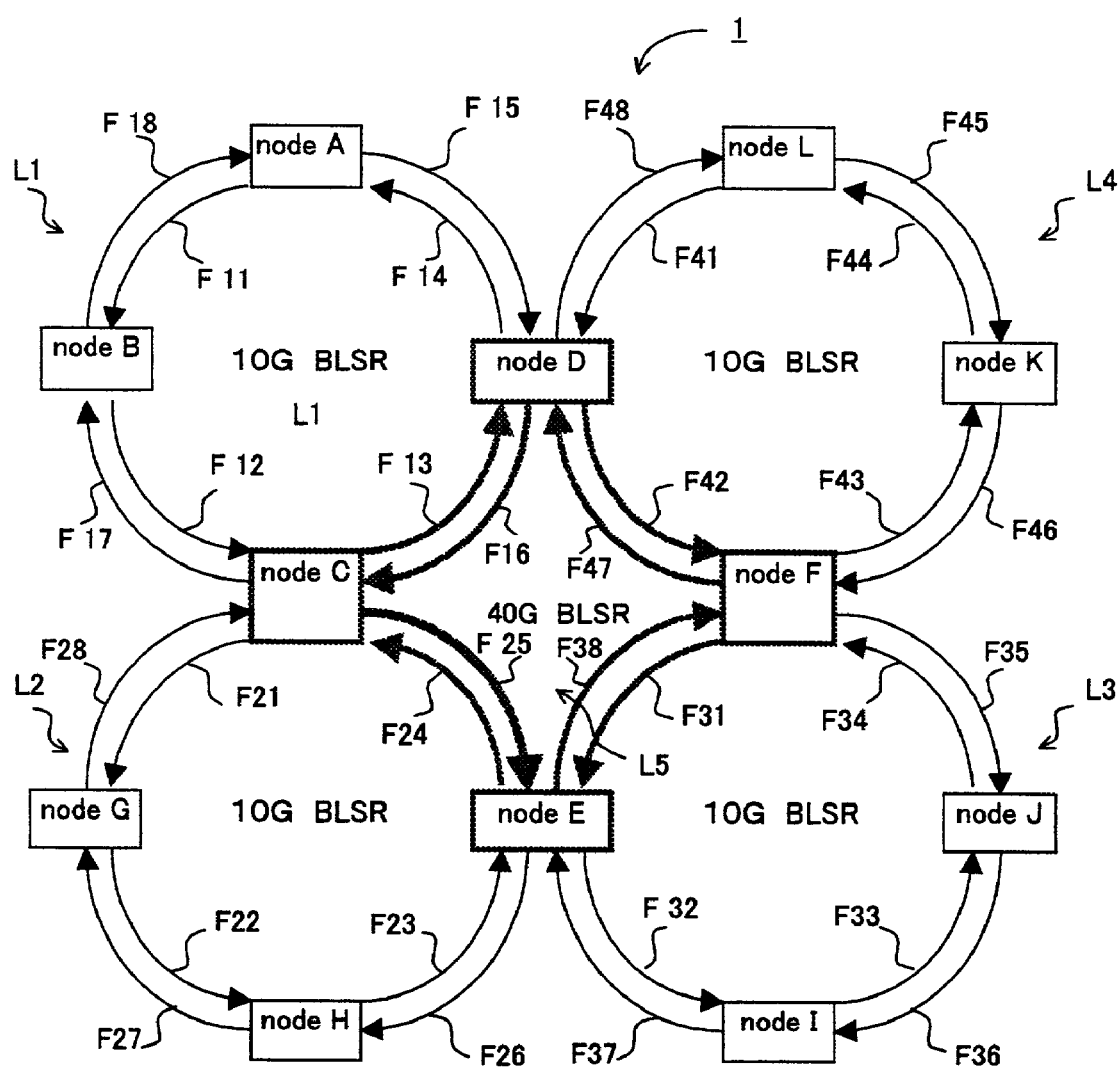
FIG. 1 is a block diagram showing an example of the construction of a network system according to an embodiment of the present invention.

FIG. 1 is a block diagram showing an example of the construction of a network system according to an embodiment of the present invention. In this network system 1, as one example, four ring networks L1 through L4 which have a transmission speed of 10 G [bps] in an OC (optical carrier)-192 in a SONET (synchronous optical network) when used singly are connected to each other. Each of the ring networks L1 through L4 is a BLSR system.

This network system 1 has twelve node devices (or transmission devices, hereafter referred to simply as "nodes") A through L, and thirty-two optical fibers F11 through F18, F21 through F28, F31 through F38 and F41 through F48 as transmission lines that connect these nodes.

The node C is disposed at the connection point between the ring networks L1 and L2, and is shared by both ring networks L1 and L2. Similarly, the node D is disposed at the connection point between the ring networks L1 and L4, the node E is disposed at the connection point between the ring networks L2 and L3, and the node F is disposed at the connection point between the ring networks L3 and L4.

A new ring network L5 is formed by the nodes C through F disposed at the connection points between these ring networks. In the present embodiment, this ring network L5 is also a BLSR type ring network.

In each of the ring networks L1 through L4, processing is performed according to an APS (automatic protection switch) protocol. Furthermore, processing according to an APS protocol is also performed in the ring network L5.

Accordingly, the node C has topology information and squelch information (a squelch table) for the ring networks L1, L2 and L5 to which this node belongs, and this node C performs processing according to an APS protocol (transmission of switching information (K1 and K2 information) and switching processing (switching, bridging and squelching)) for each of the ring networks L1, L2 and L5.

Similarly, the nodes D, E and F also have topology information and squelch information concerning each of the plurality of ring networks to which these nodes belong, and perform processing according to an APS protocol for each ring network.

Furthermore, since the nodes C through F belong to a plurality of ring networks, these nodes have ring construction information (described later) indicating which optical fibers belong to which ring networks. On the basis of this ring construction information, the nodes C through F transmit topology information and squelch information, and determine which of their own ring networks will be subjected to processing according to an APS protocol.

The optical fibers F11 through F14, F21 through F24, F31 through F34 and F41 through F44 transmit signals in the counterclockwise direction in the figures. The optical fibers F15 through F18, F25 through F28, F35 through F38 and F45 through F48 transmit signals in the clockwise direction in the figures. Below, these optical fibers will also be referred to as "lines" in some cases.

In this network system 1, four ring networks which have a transmission speed (transmission capacity) of 10 G [bps] are connected. As a rule, therefore, the optical fibers that make up the network system 1 have a transmission speed of 10 G [bps]. However, a transmission speed that is higher than that of the other optical fibers (i. e., a larger transmission capacity) is assigned to the optical fibers that make up the ring network L5.

Specifically, a transmission speed that is higher than 10 G [bps] (40 G [bps] in the present embodiment) is assigned to the optical fibers F13, F16, F24, F25, F31, F38, F42 and F47. However, optical fibers which are the same as the other 10 G [bps] optical fibers are used as these optical fibers; only the transmission speed is increased. Accordingly, there is no increase in the cost of the optical fibers.

The reason for increasing the transmission speed in this manner is as follows: specifically, the traffic that is transmitted via the ring network L5 includes traffic that is transmitted over a plurality of ring networks (e.g., traffic that is transmitted from the nodes of the ring network L1 to the nodes of L3 (and in the opposite direction) and traffic that is transmitted from the nodes of the ring network L4 to the nodes of L2 (and in the opposite direction)) in addition to the traffic of each of the ring networks L1 through L4; accordingly, these optical fibers require a larger transmission capacity than the other optical fibers.

By thus increasing the transmission capacity of lines through which a larger quantity of traffic is transmitted in a case where a plurality of ring networks are combined, it is possible to eliminate communications bottlenecks. Furthermore, since the transmission capacity of the other lines is maintained at 10 G [bps], the bandwidth of these lines is effectively utilized.

Furthermore, the setting of the increased transmission capacity at 40 G [bps], which is four times 10 G [bps], is an example; in concrete terms, the setting of this value may be determined by experiment, simulation, actual operation or the like with consideration given to the characteristics of the network system such as the quantity of traffic and the like. Furthermore, the setting of the lines F13, F16, F24, F25, F31, F38, F42 and F47 at 40 G [bps] is also an example; depending on the quantity of traffic, some of these lines may be left at 10 G [bps], and lines other than these may be set at 40 G [bps] in some cases. Furthermore, it is also possible to set the transmission speeds at different values, with (for example) the lines F16 and F25 being set at 40 G [bps], and the lines F24 and F13 being set at 30 G [bps]; moreover, the transmission speeds of all of these lines may be set at different values.

Since 10 G [bps] lines (hereafter referred to as "10 G lines") and 40 G [bps] lines (hereafter referred to as "40 G lines") are present in this network system 1, the nodes C through F that transmit signals between both types of lines must multiplex information from the 10 G lines into information transmitted to the 40 G lines, and must demultiplex the information from the 40 G lines into the 10 G lines. Systems (methods) which can be used for this purpose include the digital wrapper system (method) and the OHBT (overhead byte transparency) system (method).

The frame multiplexing methods used in the both systems, the construction of the nodes C, D, E and F in both systems, the processing according to an APS protocol in the case of normal operation (when no trouble occurs) and the processing according to an APS protocol when trouble occurs will be described below.

Frame Multiplexing Methods

Figure 2A:
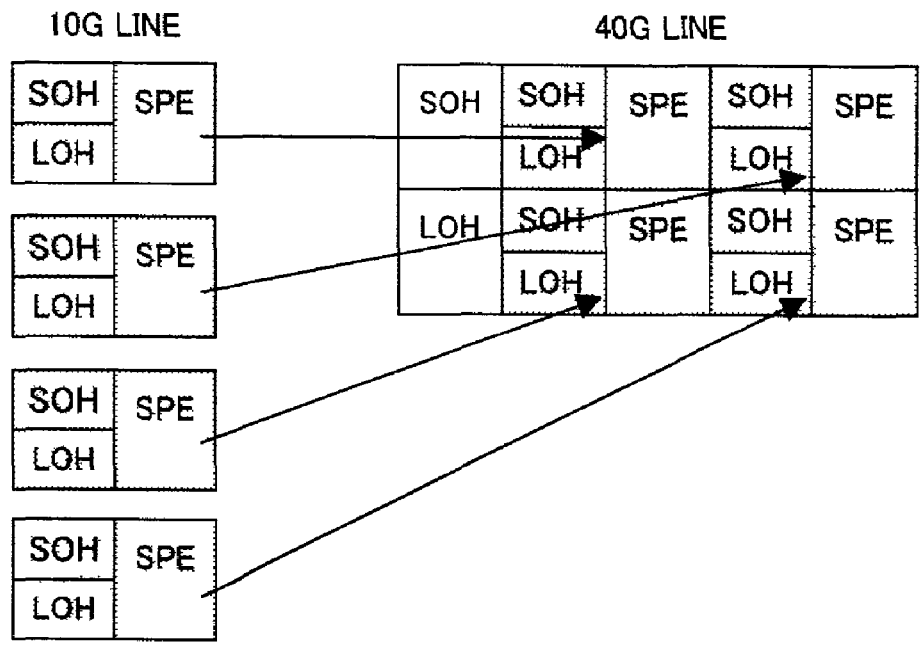
FIG. 2A shows the information multiplexing method used in the digital wrapper system.
Figure 2B:
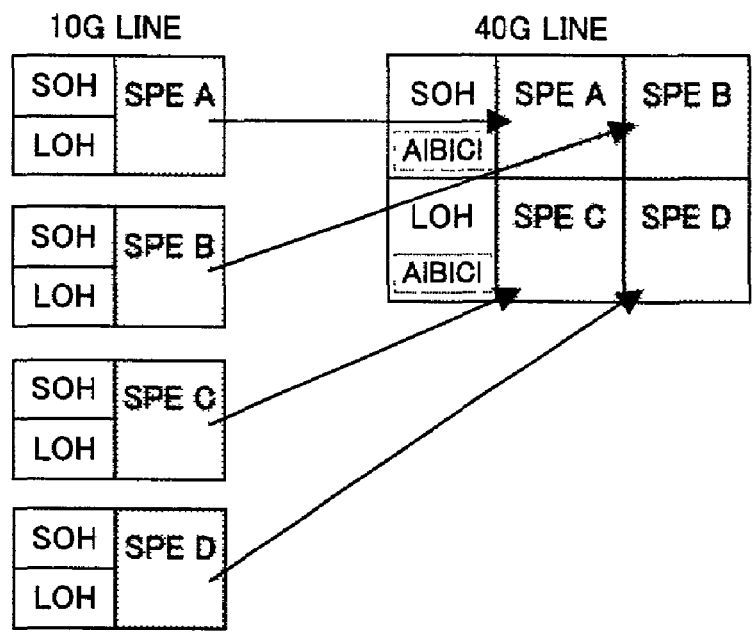
FIG. 2B shows the information multiplexing method used in the OHBT system.

FIG. 2A shows the information multiplexing method used in the digital wrapper system, and FIG. 2B shows the information multiplexing method used in the OHBT system.

In the digital wrapper system, in cases where a frame of 40 G lines (hereafter referred to as a "40 G frame") is prepared from frames of 10 G lines (hereafter referred to as "10 G frames"), the overhead parts (section overhead (SOH) and line overhead (LOH)) and payload parts (information parts) of four 10 G frames are accommodated "as is" in the payload part of a 40 G frame, and an overhead part (SOH and LOH) for the 40 G frame is newly added. on the other hand, in the OHBT system, the payload parts of four 10 G frames are accommodated in the payload part of a 40 G frame, and only the necessary information contained in the overhead parts of the four 10 G frames is accommodated in the overhead part of the 40 G frame.

Thus, in the case of the digital wrapper system, the overhead part of a 40 G frame is added to four 10 G frames (overhead parts and payload parts). Accordingly, in actuality, the transmission capacity of a 40 G line is 40 G+α [bps] with the overhead part added (α is a positive numerical value corresponding to the transmission capacity in the overhead part).

Furthermore, it goes without saying that topology information, squelch information (a squelch table), switching information based on the APS protocol (K1 and K2 information) and the like are contained in the overhead part.

Construction of Nodes

The nodes C, D, E and F that make up the ring network L5 all have the same construction. Below, therefore, this construction will be described using the node C as a representative example. Furthermore, the nodes A, B, G, H, I, J, K and L other than these nodes C, D, E and F have the same construction as conventional nodes into which two 10 G lines are input and from which two 10 G lines are output; accordingly, a description of these nodes will be omitted here.

(1) Construction of Nodes in the Digital Wrapper System

Figure 3:
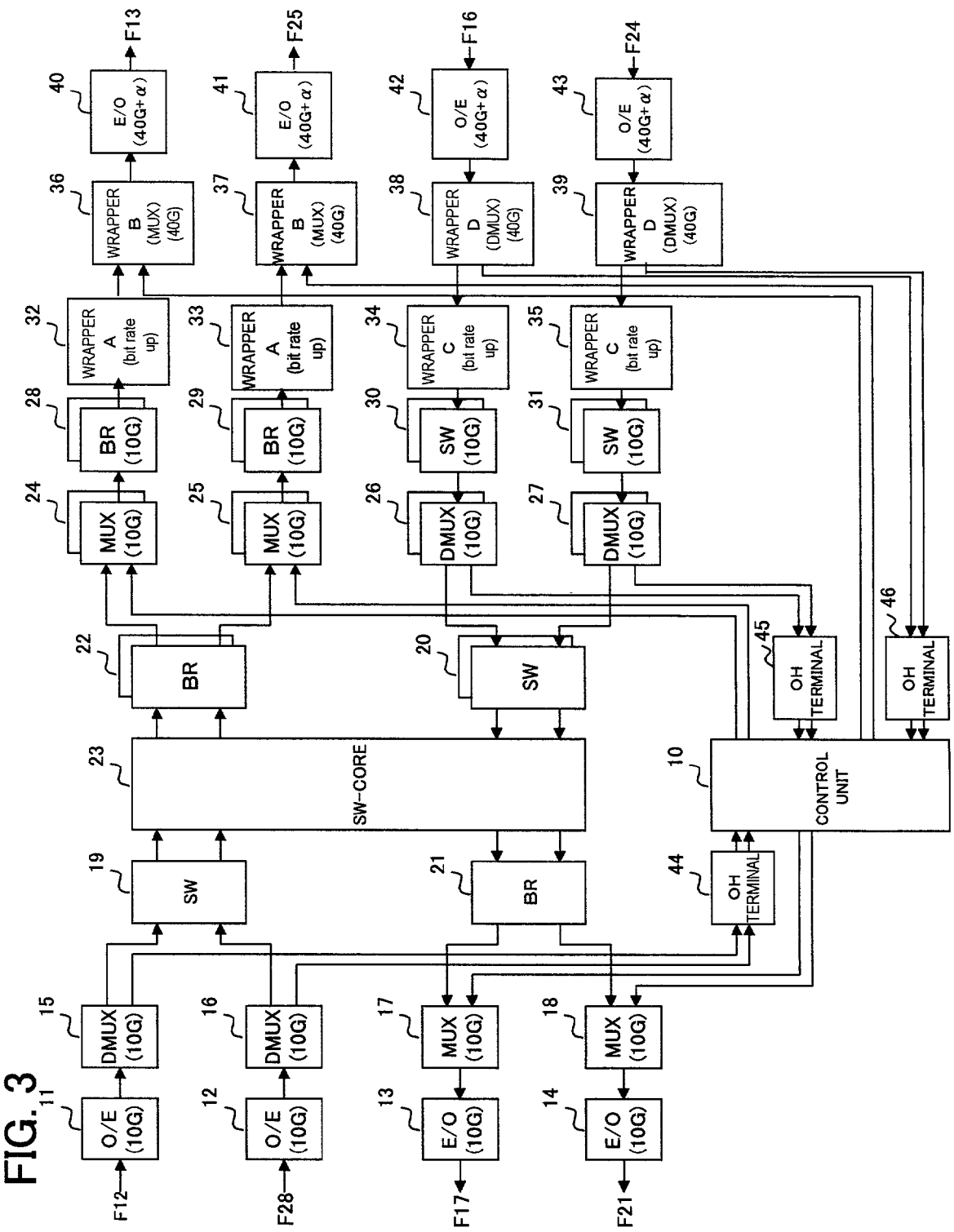
FIG. 3 is a block diagram showing the construction of the node C in the digital wrapper system.

FIG. 3 is a block diagram which shows the construction of the node C in the digital wrapper system.

The node C comprises a control device 10, optical/electrical signal converters (O/E) 11 and 12 for 10 G lines, electrical/optical signal converters (E/O) 13 and 14 for 10 G lines, demultiplexers (DMUX) 15, 16, 26 and 27 for 10 G lines, multiplexers (MUX) 17, 18, 24 and 25 for 40 G lines, E/Os 40 and 41 for 40 G lines, an O/E 42 for 40 G lines, first digital wrapper parts (wrappers A (bit rate up)) 32 and 33, second digital wrapper parts (wrappers B (MUX)) 36 and 37, third digital wrapper parts (wrappers C (bit rate down)) 34 and 35, fourth digital wrapper parts (wrappers D (DMUX)) 38 and 39, switch parts (SW) 19, 20, 30 and 31, a switch core part (SW-CORE) 23, bridge parts (BR) 21, 22, 28 and 29, and OH terminal devices 44 through 46 which terminate the overhead parts.

Here, the BR 22, SW 20, MUXs 24 and 25, DMUXs 26 and 27, BRs 28 and 29 and SWs 30 and 31 each process the data of four 10 G lines; accordingly, four units that process 10 G line data are provided.

The O/Es 11 and 12 are respectively connected to the 10 G lines F12 and F28, and the optical signals that are input from these lines are converted into electrical signals and sent to the DMUXs 15 and 16. The E/Os 13 and 14 are respectively connected to the 10 G lines F17 and F21, and the electrical signals that are input from the MUXs 17 and 18 are converted into optical signals and output to the 10 G lines F17 and F21.

The O/Es 42 and 43 are respectively connected to the 40 G lines F16 and F24, and the optical signals that are input from these lines are converted into electrical signals and sent to the DMUXs 38 and 39. The E/Os 40 and 41 are respectively connected to the 40 G lines F13 and F25, and the electrical signals that are input from the MUXs 36 and 37 are converted into optical signals and output to the 40 G lines F13 and F25.

In the digital wrapper system, as was described above, an overhead part is added to the 40 G payload part, so that in actuality, it is necessary to increase the transmission capacity by an amount corresponding to the overhead part. For this reason, the transmission capacity (transmission speed) is increased by an amount corresponding to the overhead part (α in FIG. 3) in both the O/Es 42 and 43 and E/Os 40 and 41.

The DMUXs 15 and 16 respectively separate the overhead parts and payload parts of the 10 G frames of the 10 G lines F12 and F28, and send the payload parts to the SW 19 and the overhead parts to the OH terminal device 44. The wrappers D 38 and 39 respectively separate the overhead parts and payload parts of the 40 G frames of the 40 G (+α) lines F16 and F24, and send the payload parts to the wrappers C 34 and 35, and the overhead parts to the OH terminal device 46.

The MUXs 17 and 18 construct 10 G frames by multiplexing overhead parts sent from the control device 10 and payload parts sent from the BR 21, and respectively send the 10 G frames thus constructed to the E/Os 13 and 14. The wrappers B 36 and 37 construct 40 G frames by multiplexing overhead parts sent from the control device 10 and payload parts respectively sent from the wrappers A 32 and 33, and respectively send the 40 G frames thus constructed to the E/Os 40 and 41.

The SWs 19 and 20 perform switching according to an APS protocol under the control of the control device 10 when trouble occurs. During normal operation in which no trouble has occurred, the SWs 19 and 20 send input data to the SW-CORE 23 without any switching.

The BRs 21 and 22 perform bridging according to an APS protocol under the control of the control device 10 when trouble occurs. During normal operation in which no trouble has occurred, the BRs 21 and 22 output input data from the SW-CORE 23 to the MUXs 17 and 18 or 24 and 25 without bridging.

The SW-CORE 23 performs cross connection (switching) of input data under the control of the control device 10, and is devised so that input data is output to lines on the output side. For example, in a case where input data from the 10 G line F12 is output to the 10 G line F21 during normal operation, the SW-CORE part 23 cross-connects the input data from the 10 G line F12, and outputs this data to the 10 G line F21 via the BR 21, MUX 18 and E/O 14.

The MUXs 24 and 25 respectively construct four 10 G frames by multiplexing the payload parts of four 10 G frames sent from the BR 22 and the overhead parts of 10 G frames sent from the control device 10, and output these frames to the BRs 28 and 29. The BRs 28 and 29 perform bridging in 10 G frame units under the control of the control device 10.

The wrappers A 32 and 33 respectively accommodate the payload parts of four 10 G frames sent from the BRs 28 and 29 in the payload part of one 40 G frame (see FIG. 2A), convert the transmission speed to a speed of 40 G [bps] (bit rate up), and output the results to the wrappers B 36 and 37.

The wrappers C 34 and 35 respectively split the four 10 G frames contained in the payload parts of the 40 G frames sent from the wrappers D 38 and 39 into four parts, convert the transmission speed to a speed of 10 G [bps] (bit rate down), and output the results to the SWs 30 and 31.

The SWs 30 and 31 respectively switch in 10 G frame units the four 10 G frames sent from the DMUXs 38 and 39 under the control of the control device 10.

The DMUXS 26 and 27 respectively separate the four 10 G frames sent from the SWs 30 and 31 into overhead parts and payload parts, send the overhead parts to the OH terminal device 45, and send the payload parts to the SW 20.

The OH terminal devices 44 through 46 terminate the overhead parts, and the input overhead parts are stored in a readable manner in the control device 10. The overhead parts of 10 G frames are input into the OH terminal device 44. The overhead parts of 10 G frames contained in the payload parts of 40 G frames are input into the OH terminal device 45. The overhead parts of 40 G frames are input into the OH terminal device 46.

The control device 10 refers to the overhead parts stored in the OH terminal devices 44 through 46, and stores topology information and squelch information contained in the overhead parts. Furthermore, once the topology information and squelch information have been stored, the information is not subsequently updated as long as there is no alteration (updating) of the topology information or squelch information.

Furthermore, the control device 10 controls the SWs 19, 20, 30 and 31 and BRs 21, 22, 28 and 29 on the basis of switching information (K1 and K2 information) contained in the overhead parts, and perform switching processing (bridging and switching) according to an APS protocol, as well as squelch processing and the like. For example, switching processing, squelch processing and the like for the 40 G ring network L5 are performed on the basis of switching information of the overhead parts of the 40 G frames stored in the OH terminal device 46. Furthermore, switching processing, squelch processing and the like for the 10 G ring network L1 are performed on the basis of switching information of the overhead parts of the 10 G frames stored in the OH terminal device 45.

Furthermore, when trouble occurs in the input lines to the node of the control device 10, the control device 10 detects this trouble and prepares switching information according to the abovementioned APS protocol. This switching information is accommodated in the overhead parts and transmitted to the other nodes.

Furthermore, as was described above, the control device 10 controls the SW-CORE 23, and performs cross-connections. Moreover, the control lines through which the control signals of the control device 10 flow are not shown in the figures.

As was described above, the topology information stored by the control device 10 is topology information for each of the ring networks L1, L2 and L5 to which the node of the control device 10 (here, the node C) is connected. The same is true of the squelch information stored by the control device 10.

Furthermore, the control device 10 has ring construction information indicating which of the lines connected to the node of the control device 10 belong to which ring networks. For example, the ring construction information possessed by the control device 10 of the node C is information which indicates that the lines F12 and F17 (see FIG. 1) belong to the ring network L1, that the lines F21 and F28 belong to the ring network L2, that the lines F13 and F16 belong to the ring networks L1 and L5, and that the lines F24 and F25 belong to the ring networks L2 and L5. Here, furthermore, the ring construction information is expressed by line (optical fiber) discrimination symbols F12 and the like; however, in the control device 10, this ring construction information may be expressed by discrimination information assigned to the O/Es or E/Os constituting the line input-output interfaces instead of being expressed by line discrimination symbols.

On the basis of this ring construction information, the control device 10 transmits topology information, squelch information and switching information, and performs cross-connections and switching processing (describe in detail later) according to the APS protocol.

For example, the topology information input from the line F12 (i.e., from the O/E 11) is output to the line F13 (i.e., the E/O 40) that makes up the ring network L1 on the basis of ring construction information which indicates that the line F12 belongs to the ring network L1. In the case of the topology information input from the line F24 (O/E 43), the transmission destination varies according to the topology information in the overhead parts of the 40 G frames and the topology information in the overhead parts of the 10 G frames accommodated in the payload parts of the 40 G frames. The former information is output to the line F13 belonging to the ring network L5 on the basis of ring construction information indicating that the line F24 belongs to the ring network L5. Information form the node H among the latter information is output to the line F21 on the basis of ring construction information indicating that the line F24 belongs to the ring network L2.

Furthermore, the control device 10 can also be constructed using a CPU or micro-computer, and a program that is executed by this CPU or micro-computer, or can be constructed using hardware circuits that realize the processing executed according to the abovementioned program.

(2) Construction of Nodes in the OHBT System

Figure 4:
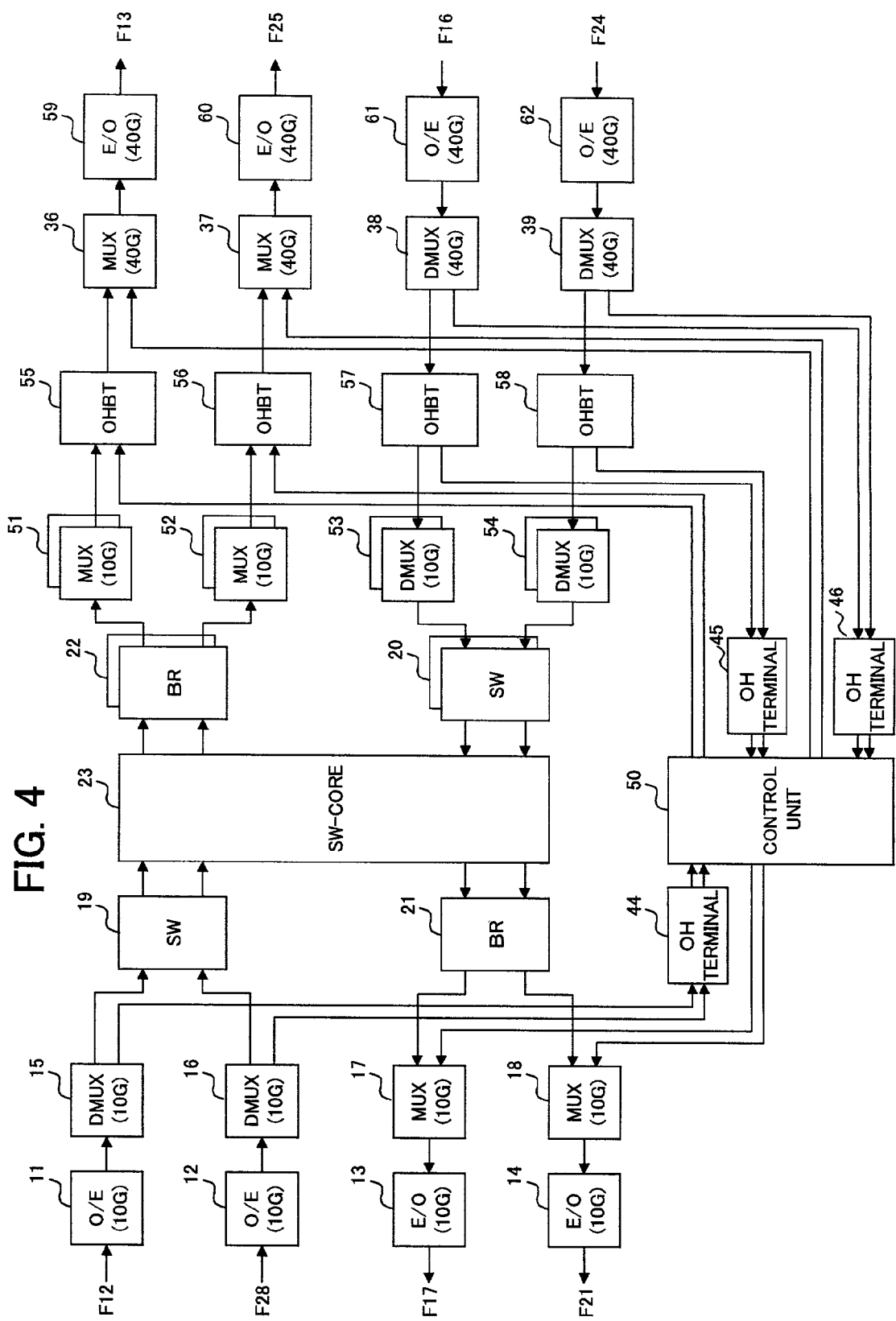
FIG. 4 is a block diagram illustrating the construction of the node C in the OHBT system.

FIG. 4 is a block diagram illustrating the construction of the node C in the OHBT system. Constituent elements which are the same as the constituent elements of the node in the digital wrapper system are labeled with the same symbols, and a description of these constituent elements is omitted.

In the OHBT system, E/Os with a transmission speed of 40 G [bps] are used as the E/Os 59 through 62 connected to the 40 G lines.

Furthermore, in the OHBT system, OHBT parts 55 through 58 are installed instead of the digital wrapper parts 32 through 35. The OHBT parts 55 and 56 respectively convert four 10 G frames sent from the MUXs 51 and 52 into a single 40 G frame. The OHBT parts 57, 58 respectively break down frames input from the 40 G lines into four 10 G frames. The payload parts of the 10 G frames are respectively sent to the DMUXs 53 and 54, and the overhead parts are sent to the OH terminal device 45.

The BRs 28 and 29 and SWs 30 and 31 installed in the digital wrapper system are not installed in the OHBT system.

The control device 50 has functions similar to those of the control device 10; however, since the processing that is performed in cases where trouble occurs is different in part, different symbols are assigned. This different processing will be described in detail later.

Processing According to APS Protocol

In the network system 1, the processing according to an APS protocol that is performed in cases where trouble occurs in the lines or nodes may differ in some cases between the digital wrapper system and the OHBT system.

Below, the common points and points of difference in APS protocol processing between the two systems will be described using two transmission routes #1 and #2 as examples.

(1) Processing According to APS Protocol during Normal Operation

Figure 5:
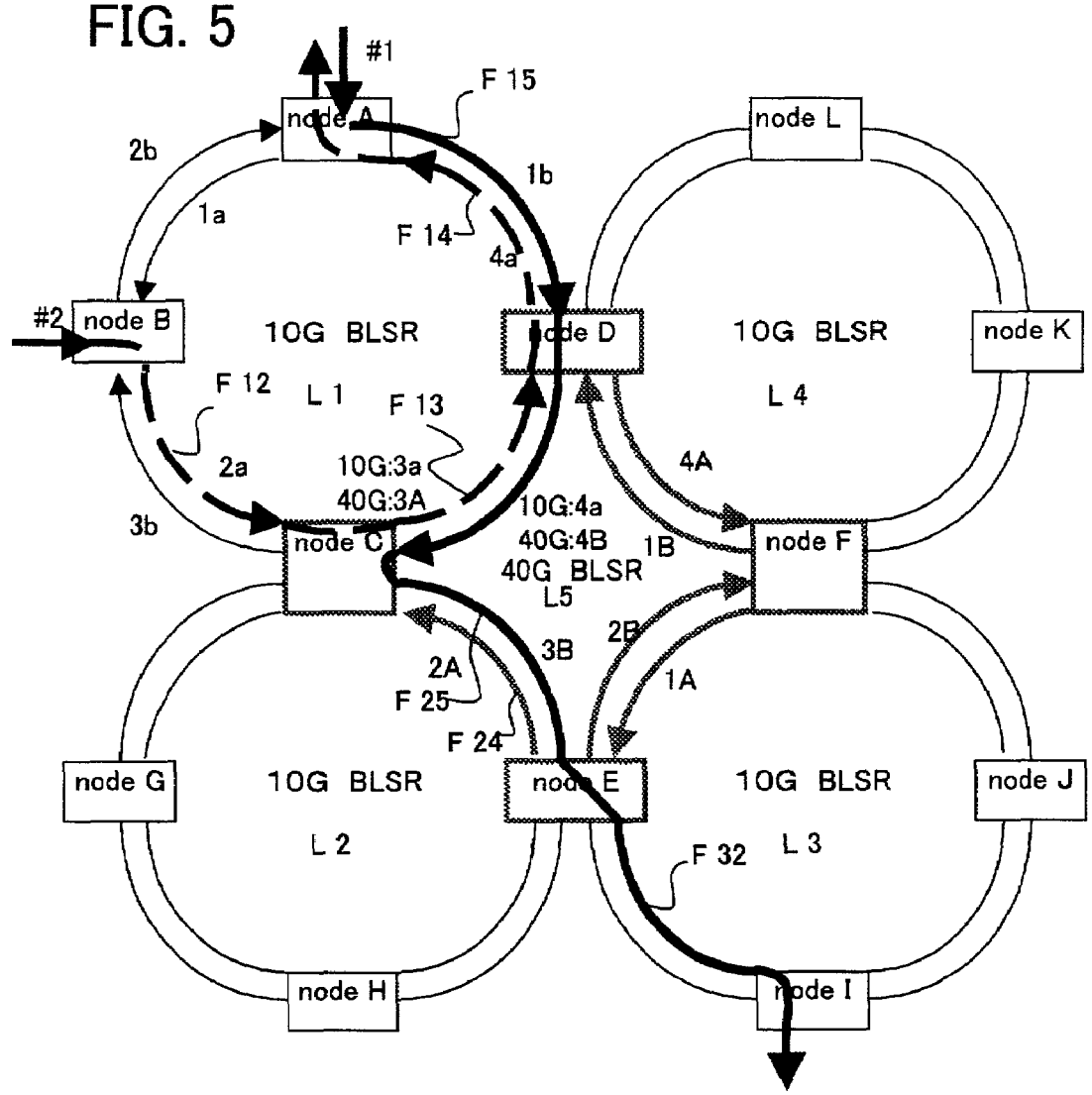
FIG. 5 shows the two transmission routes #1 and #2 during normal operation in which no trouble has occurred in the network system 1.

First, the processing according to an APS protocol during normal operation will be described. FIG. 5 shows the two transmission routes #1 and #2 during normal operation in which no trouble has occurred in the network system 1.

In the case of transmission route #1, 10 G [bps] data (hereafter referred to as "10 G data") input into the node A is transmitted from the node A via the node D, node C and node E, and is output from the node I. The node D converts 10 G data from the 10 G line F15 into 40 G [bps] data (hereafter referred to as "40 G data") using the digital wrapper system or OHBT system, and outputs this data to the line F16. Furthermore, the node E converts 40 G data from the 40 G line F25 into 10 G data using the digital wrapper system or OHBT system, and outputs this data to the line F32.

In the case of transmission route #2, 10 G data input into the node B passes through the node C and node D, and is output from the node A. The node C converts 10 G data from the 10 G line F12 into 40 G data using the digital wrapper system or OHBT system, and outputs this data to the line F13. Furthermore, the node E converts 40 G data from the 40 G line F25 into 10 G data using the digital wrapper system or OHBT system, and outputs this data to the line F32.

Thus, the transmission route #2 is formed on the ring network L1, and a portion of this route is superimposed on the ring network L5. Furthermore, the transmission route #2 is formed on the ring networks L1, L5, L2 and L3.

Accordingly, switching information (K1 and K2 information) according to the abovementioned APS protocol is transmitted separately via these respective ring networks. However, since the switching information that is transmitted via the ring networks L2 and L3 is similar to the switching information that is transmitted via the ring network L1, the switching information that is transmitted on the ring networks L1 and L5 will be described below as an example.

Figure 8A:
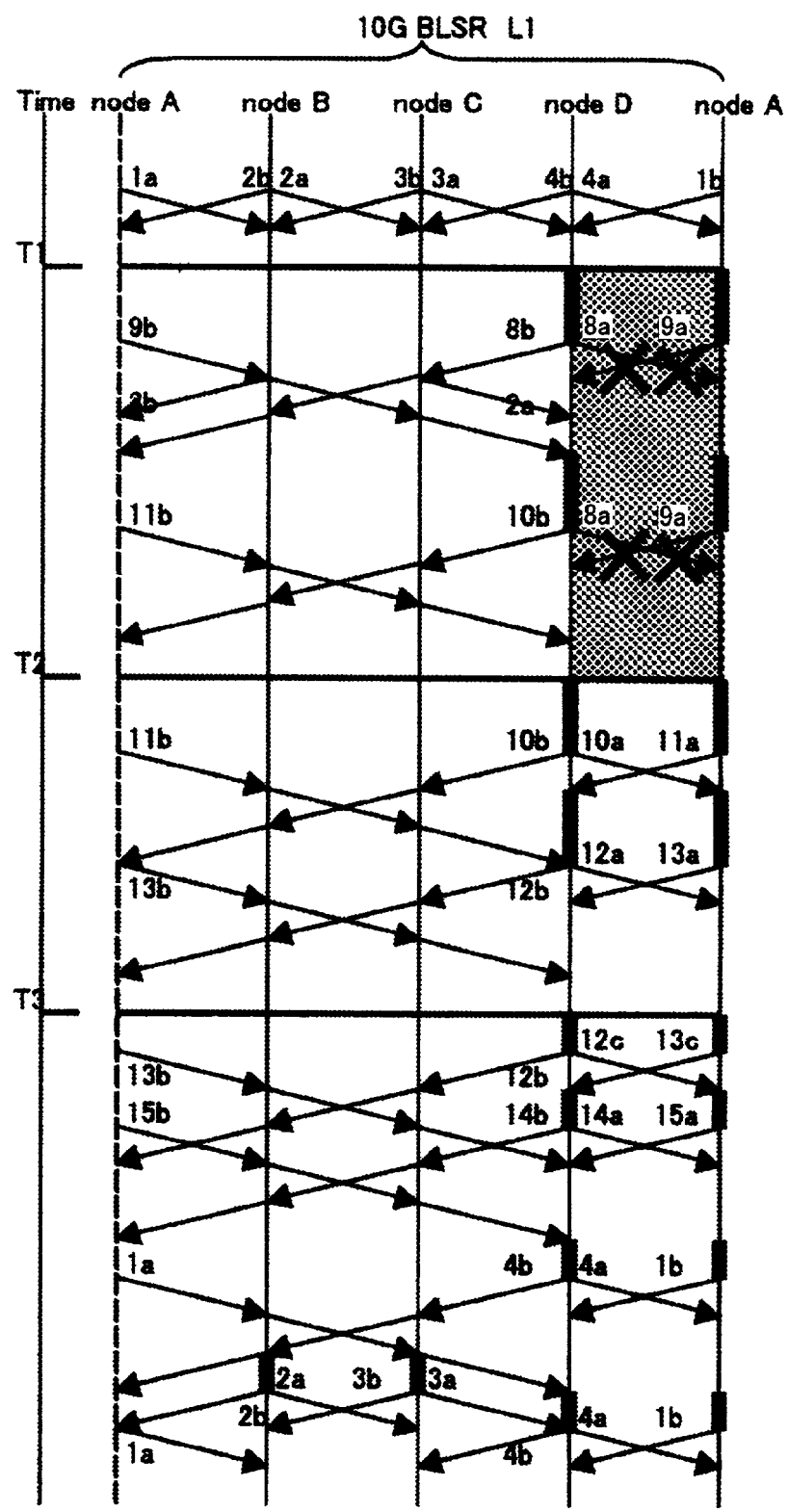
FIG. 8A and FIG. 9A show transmission and reception sequence diagrams for the switching information of the ring network L1.
Figure 8B:
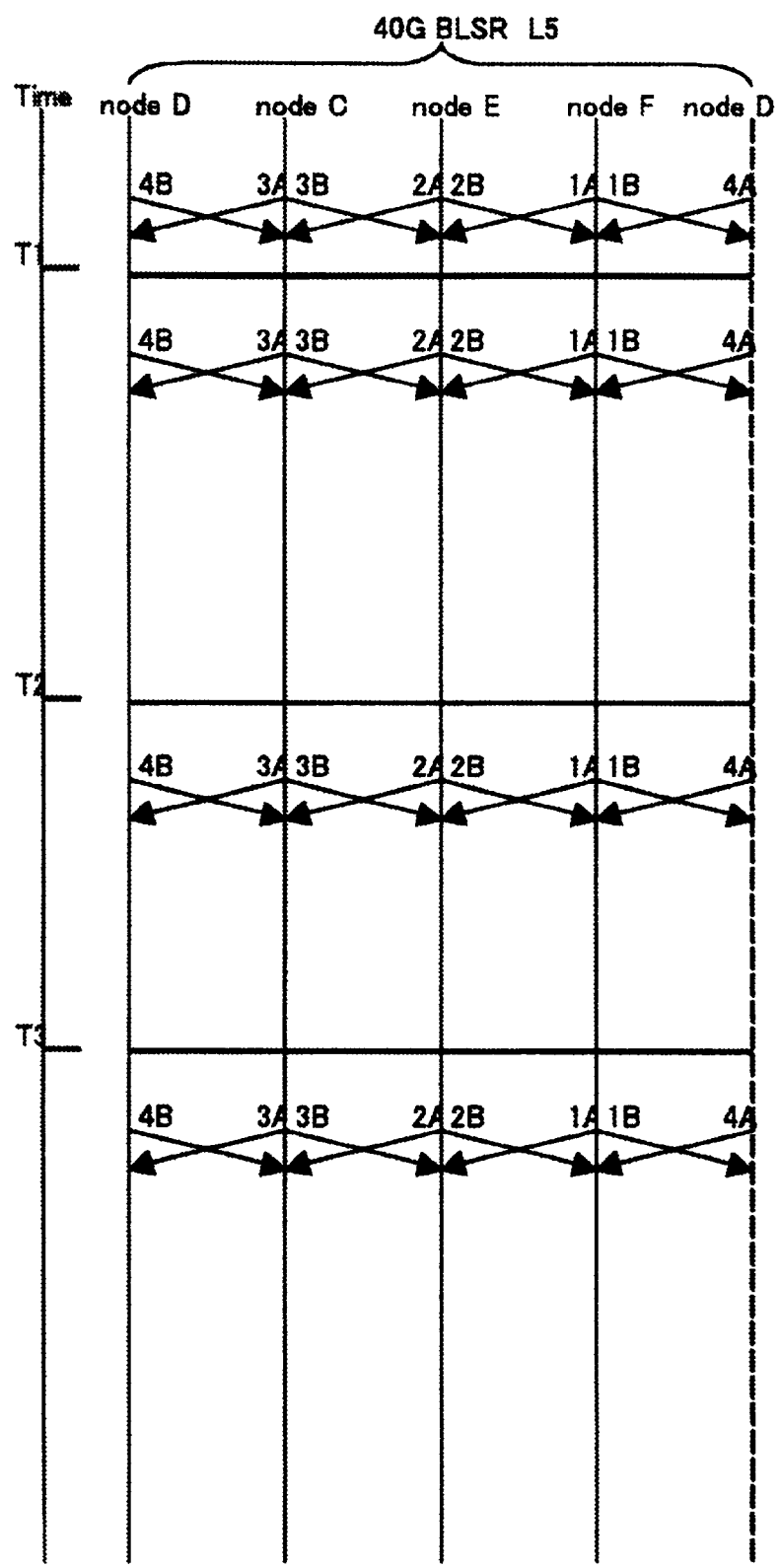
FIG. 8B and FIG. 9B show transmission and reception sequence diagrams for the switching information of the ring network L5.
Figure 9A:
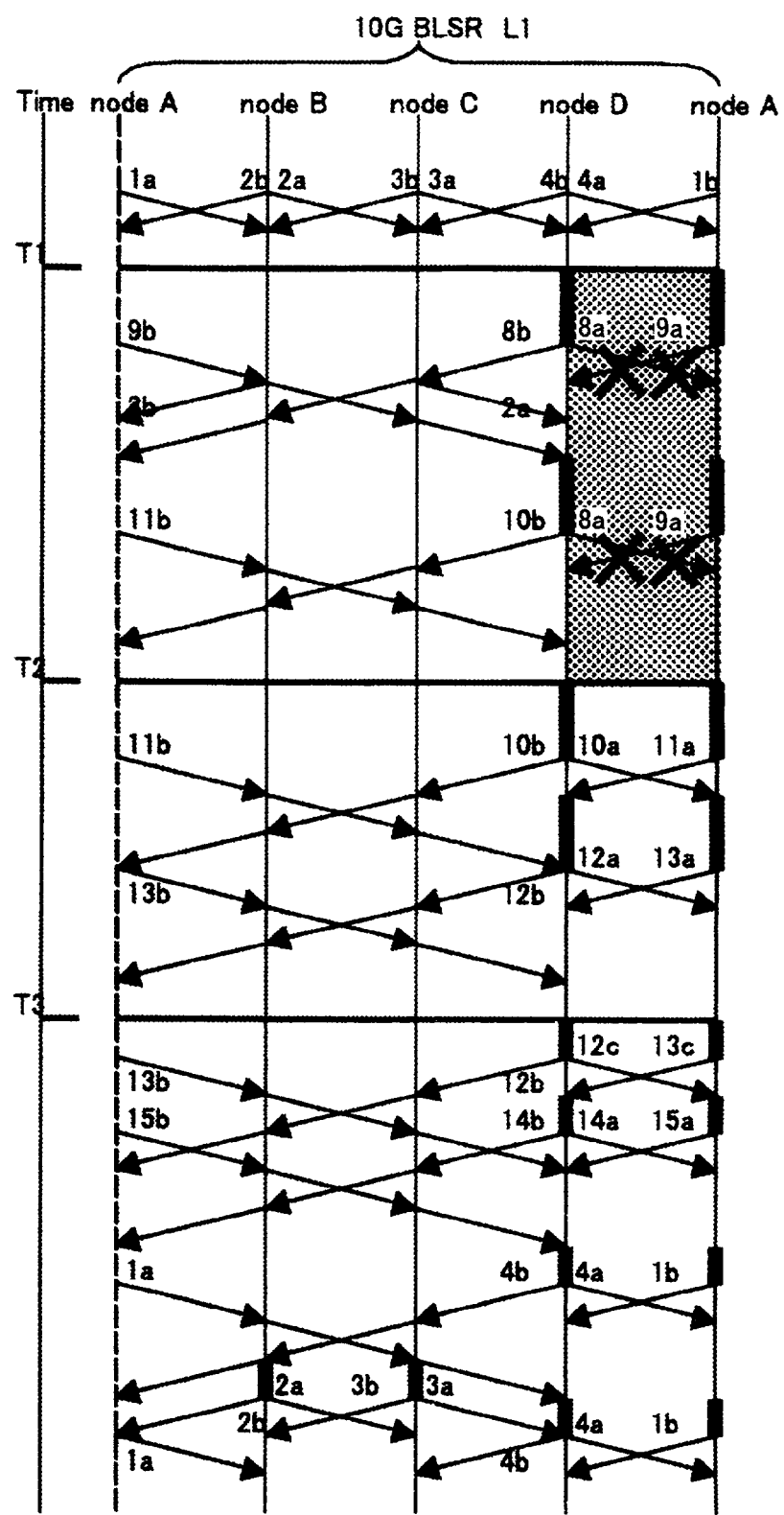
Figure 9B:
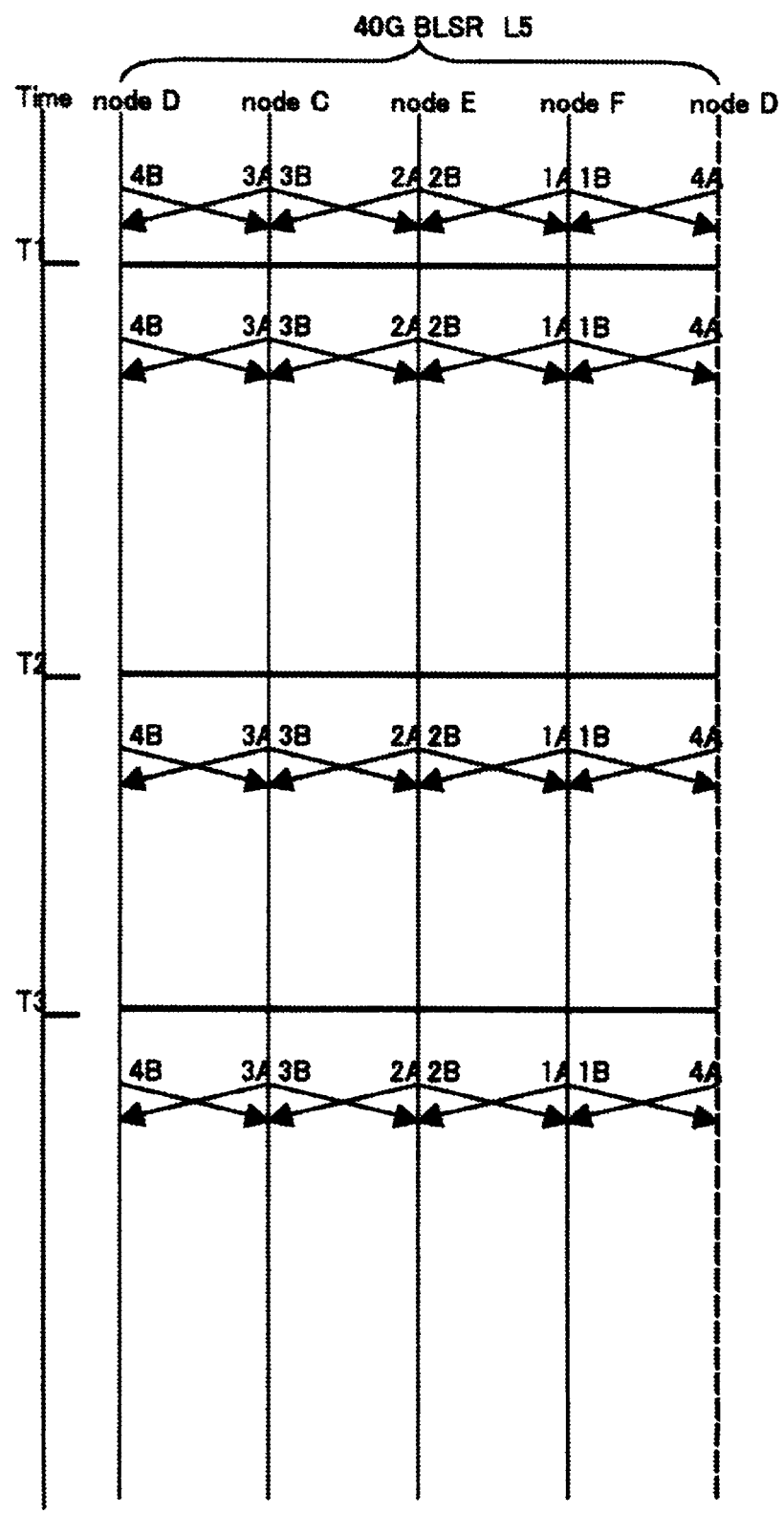

FIG. 6A shows the content of the switching information that is transmitted on the ring network L1 during normal operation, and FIG. 6B shows the content of the switching information that is transmitted on the ring network L5 during normal operation. The transmission and reception sequence of this switching information is shown in the sequence diagrams up to time T1 in FIGS. 8A, 8B and 9A, 9B. FIG. 8A and FIG. 9A are transmission and reception sequence diagrams for the switching information of the ring network L1, and FIG. 8B and FIG. 9B are transmission and reception sequence diagrams for the switching information of the ring network L5.

In the figures, the symbols 1a, 1b, 2a, 1A, 1B, 2A and the like are symbols which indicate switching information. Furthermore, the symbols that include small alphabetic characters are symbols that indicate switching information for the ring network L1, while the symbols that include capital alphabetic characters are symbols that indicate switching information for the ring network L5. The same is true in FIGS. 8 through 10, 12 through 14 and 16 through 18 described below.

Furthermore, the K1 information indicates "switching priority/transmission destination node ID". The K2 information indicates "transmission source node ID/short line (S) or long line (L)/bridging and switching status". For example, the K1 information "NR/B" of the switching information 1a indicates "no request" as the switching priority, and indicates that the transmission destination node is the node B. Furthermore, the K2 information "A/S/IDLE" of the switching information 1a indicates that the transmission destination node is the node A, that the line is the short path, and that the status of bridging and switching is IDLE.

The switching information that is transmitted in these ring networks L1 and L5, and the transmission and reception sequences of this switching information, are based on an ordinary APS protocol. Furthermore, the information in the digital wrapper system and the information in the OHBT system are the same. However, ring construction information is provided in the control devices 10 or 50 of the node C and node D, and the transmission destination node of the switching information is judged on the basis of this ring construction information. Furthermore, switching information for the ring network L1 is transmitted to transmission destinations nodes of the ring network L1, and switching information for the ring network L5 is transmitted to transmission destination nodes of the ring network L5.

Figure 7A:
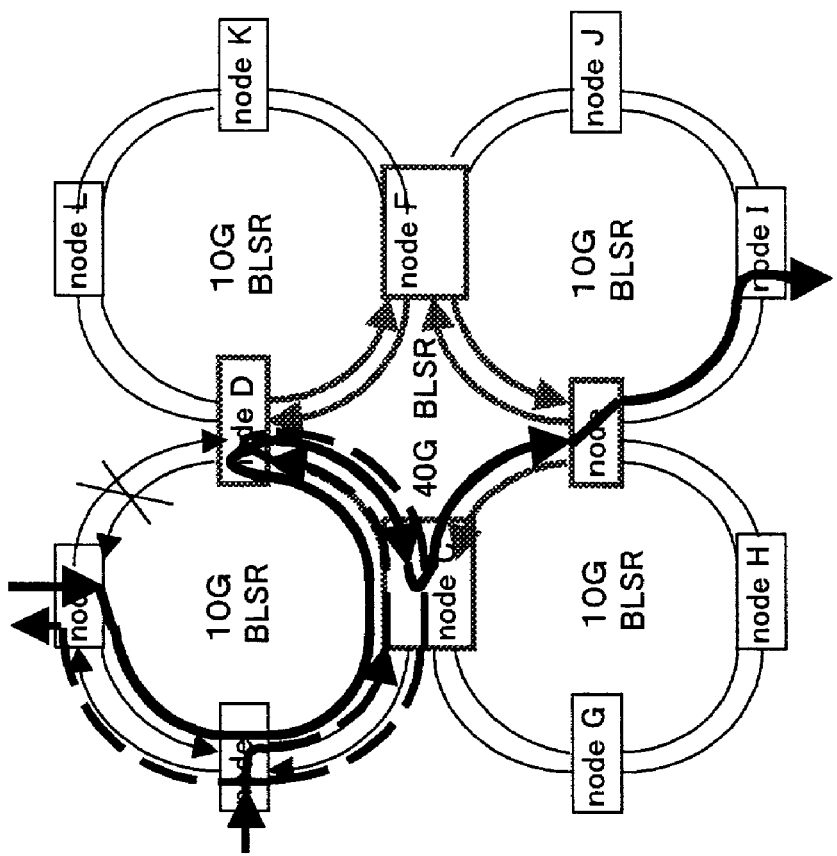
FIGS. 7A and 7B show transmission routes #1 and #2 and respective bypass routes #3 and #4 used in cases where trouble occurs in the 10G lines F14 and F15.
Figure 7B:
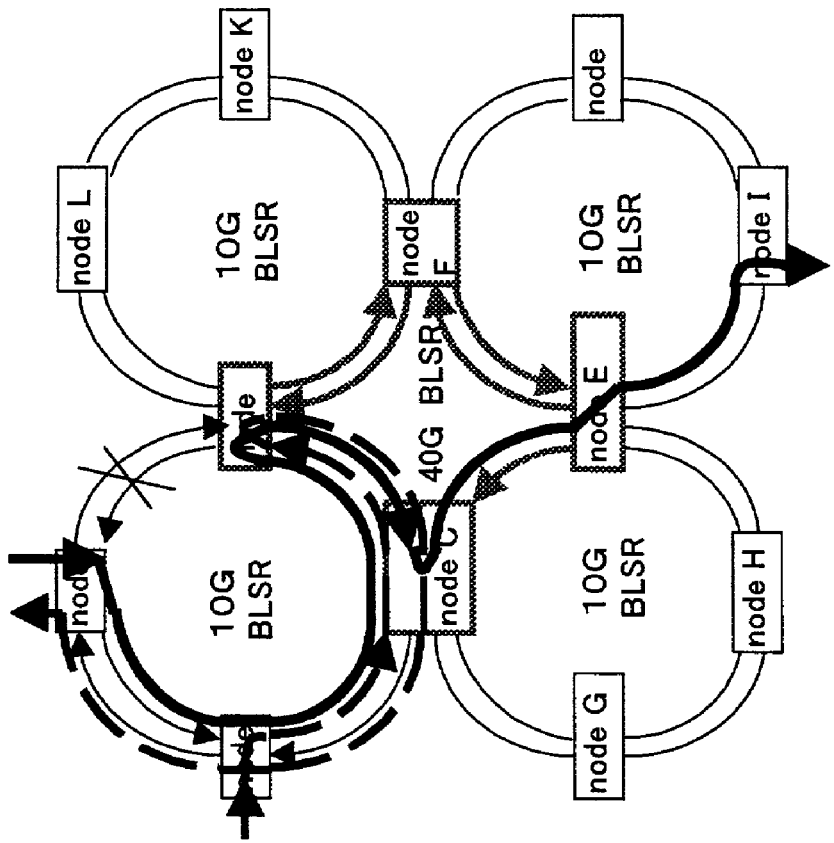

(2) Processing According to APS Protocol in Case of Trouble (a) Trouble in 10 G Lines FIGS. 7A and 7B show transmission routes #1 and #2 and respective bypass routes #3 and #4 used in cases where trouble occurs in the 10 G lines F14 and F15. FIG. 7A shows the bypass route used in the digital wrapper system, and FIG. 7B shows the bypass route used in the OHBT system.

FIG. 8 shows transmission and reception sequence diagrams for switching information in the digital wrapper system in cases where trouble has occurred in the 10 G lines. FIG. 8A is a sequence diagram for the ring network L1, and FIG. 8B is a sequence diagram for the ring network L5. FIGS. 9A and 9B show transmission and reception sequence diagrams for switching information in the OHBT system in cases where trouble has occurred in the 10 G lines. FIG. 9A is a sequence diagram for the ring network L1, and FIG. 9B is a sequence diagram for the ring network L5. Furthermore, FIG. 10 shows the contents of the switching information in FIGS. 8A, 8B, 9A and 9B.

The sequence diagrams in FIGS. 8 and 9 illustrate a case in which trouble has occurred in line F14 or F15 at time T1, and the line has recovered from this trouble at time T2. Accordingly, the processing from time T1 to T2 indicates the transmission and reception sequence of switching information for switching and bridging operations according to the APS protocol, and the processing from time T2 to T3 indicates the transmission and reception sequence of switching APS information from immediately after the recovery of the line from the trouble to the point where [the time set by] the restoration timer (wait to restore) has elapsed. The processing following time T3 indicates the restoration APS sequence that is performed after the time set by the restoration timer has elapsed. In the figures, switching information marked with an "x" indicates that this information is not transmitted to the transmission destination node because of line trouble. The same is true in FIGS. 12, 13, 16 and 17 described below.

Furthermore, "SF-R" in the K1 information means "signal fail ring", which indicates that trouble has occurred in a line. "RR-R" means "reverse request ring", and "WTR" means "wait to restore". Furthermore, "RDI" in the K2 information means "remote defect indication", "Br & SW" means "bridge and switch", and "Br" means "bridge". The same is true in FIGS. 14 and 18 below.

When trouble occurs in the 10 G lines F14 and F15, the trouble is detected by the reception-side node A in the case of the line F14, and the trouble is detected by the reception-side node D in the case of the line F15.

Following trouble detection, the node A judges on the basis of the ring construction information that the line F14 is a line that belongs only to the ring network L1. Similarly, the node D judges on the basis of the ring construction information that the line F15 is a line that belongs only to the ring network L1.

As a result, in both the digital wrapper system and OHBT system, the nodes A and D transmit switching information for performing bridging and switching according to the APS protocol on the ring network L1 only in the ring network L1. As a result, switching processing (bridging and switching) according to the APS protocol is performed only in the ring network L1. On the other hand, in the case of the ring network L5, the transmission and reception of switching information used in normal operation are performed, and switching processing is not performed.

As a result of switching, bridging is performed by the node A and switching is performed by the node D in the case of transmission route #1 in FIG. 5. In the case of transmission route #2, bridging is performed by the node D, and switching is performed by the node A.

The abovementioned transmission of switching information and switching processing are based on an ordinary APS protocol. However, ring construction information is provided in the control device 10 or 50 of the node C and node D, and switching information for performing switching and bridging is transmitted on the ring network L1 on the basis of this ring construction information.

Furthermore, similar processing, i. e., switching processing in the 10 G ring networks, is also performed in cases where trouble occurs in the other 10 G lines (e. g., the line F12 of the ring network L1 or the line F21 of the ring network L2).

(b) Trouble in 40 G LINES

Figure 11A:
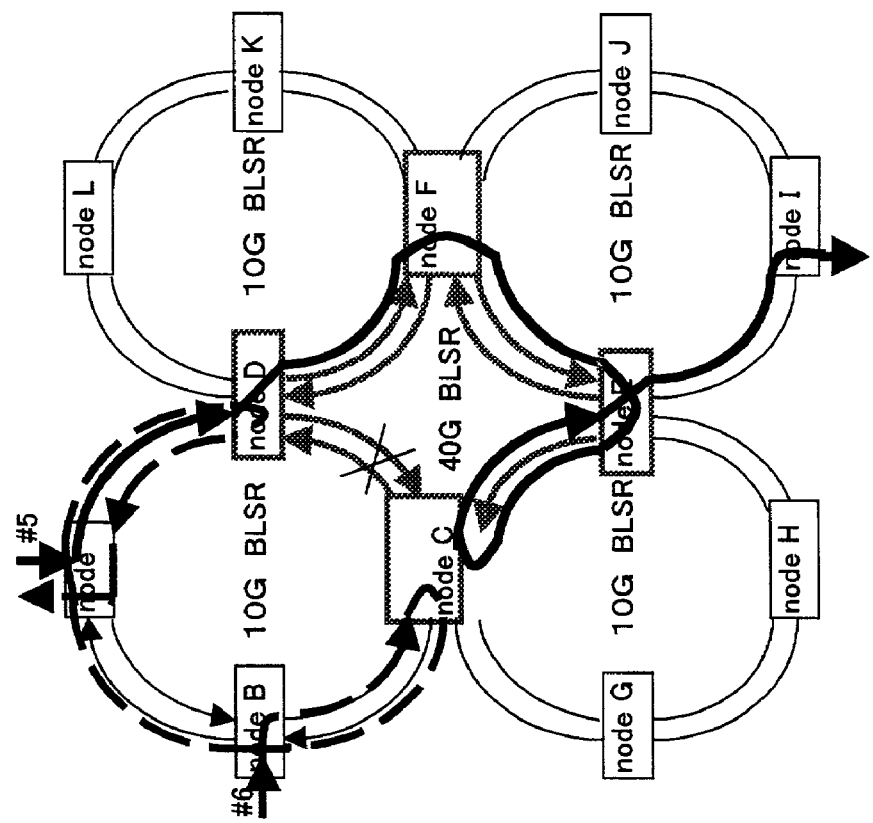
FIGS. 11A and 11B show transmission routes #1 and #2 and respective bypass routes #5 and #6 used in cases where trouble occurs in the 40G lines F13 and F16.
Figure 11B:
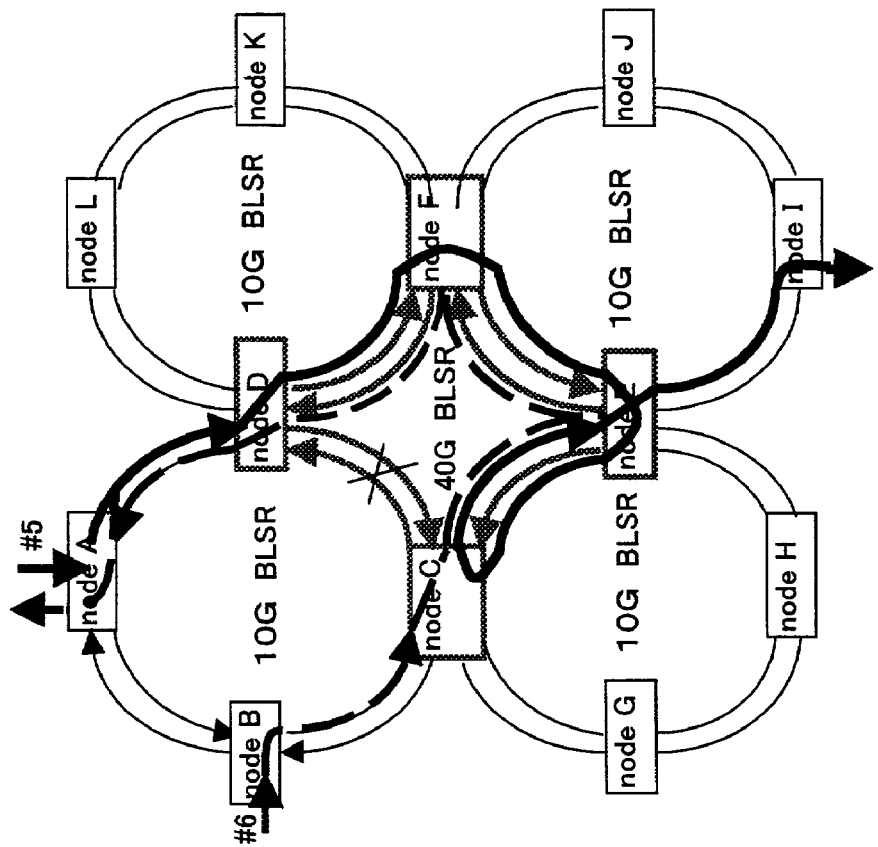

FIGS. 11A and 11B show transmission routes #1 and #2 and respective bypass routes #5 and #6 used in cases where trouble occurs in the 40 G lines F13 and F16. FIG. 11A shows the bypass route used in the digital wrapper system, and FIG. 11B shows the bypass route used in the OHBT system.

Figure 12A:
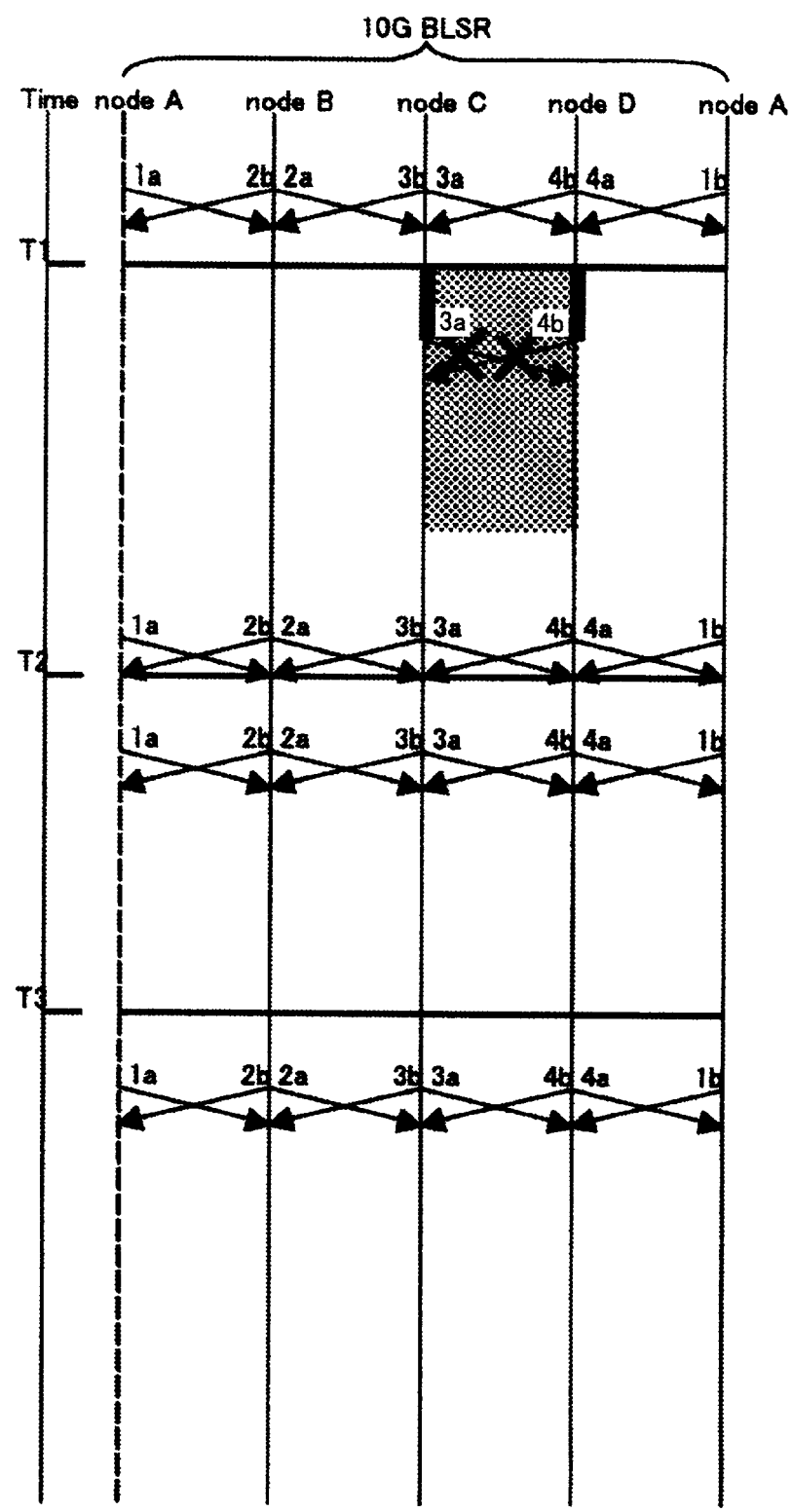
FIGS. 12A and 12B show transmission and reception sequence diagrams for switching information in the digital wrapper system in a case where trouble has occurred in a 40 G line.
Figure 12B:
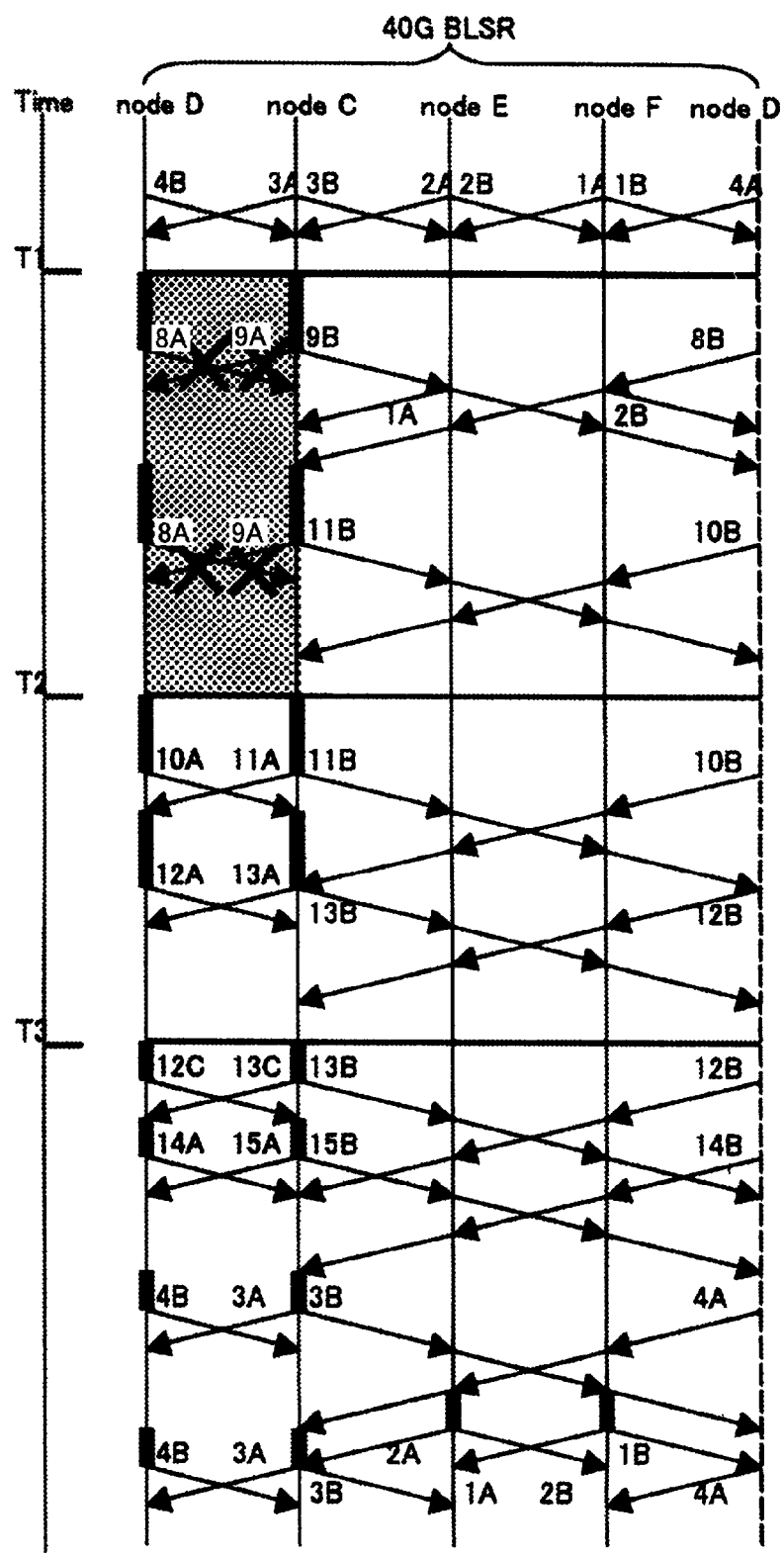
Figure 13A:
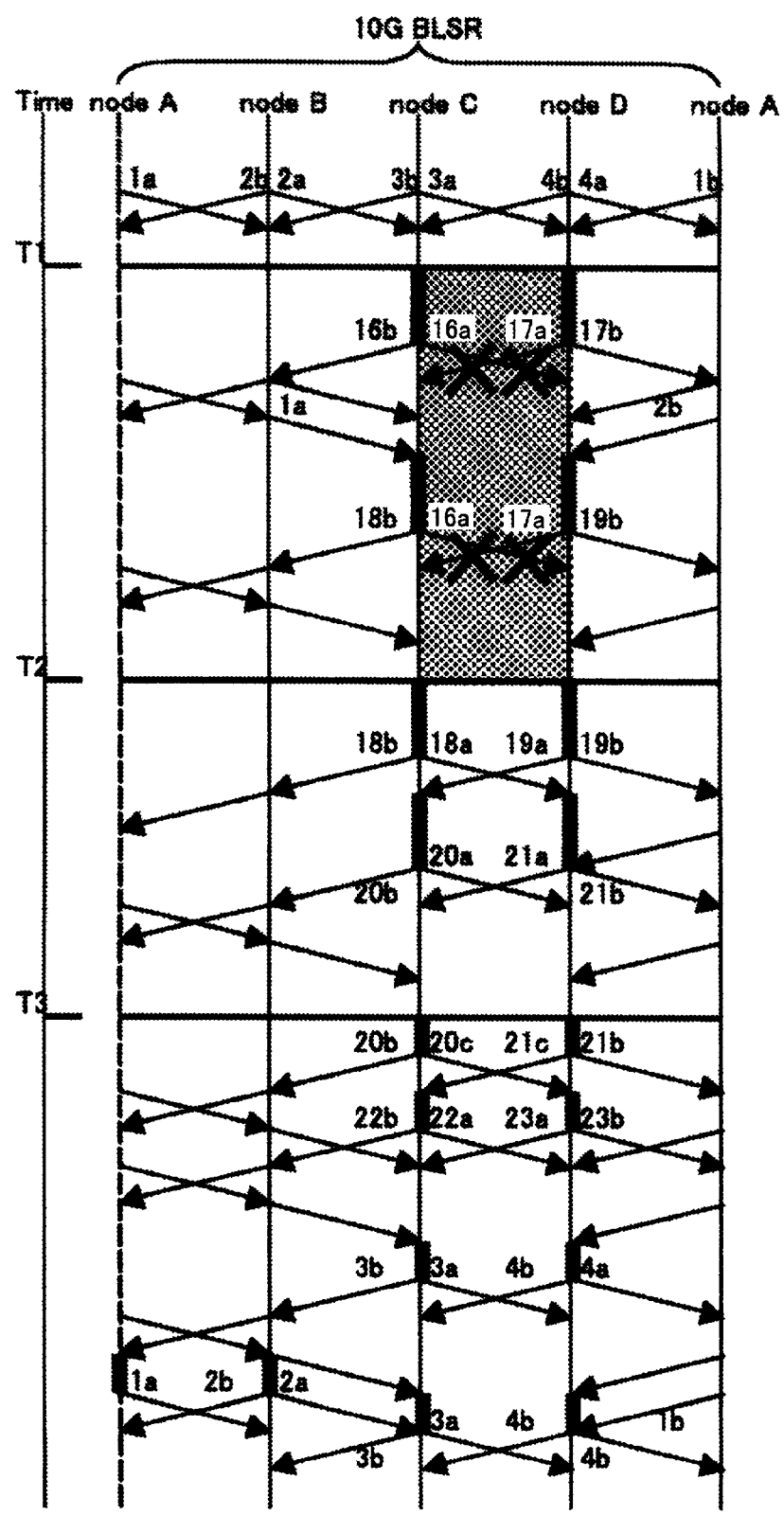
FIGS. 13A and 13B show transmission and reception sequence diagrams for switching information in the OHBT system in a case where trouble has occurred in a 40 G line.
Figure 13B:
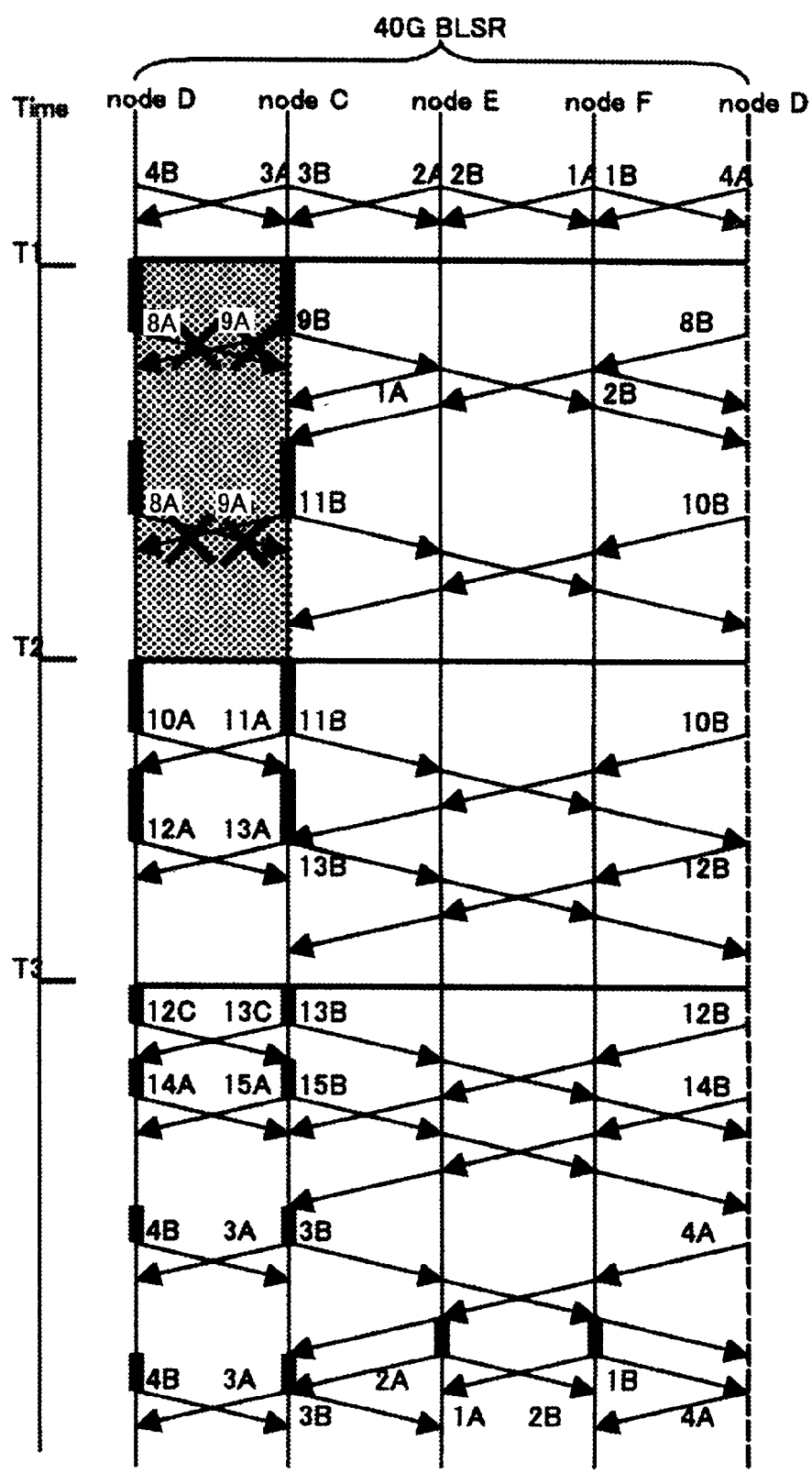

FIGS. 12A and 12B show transmission and reception sequence diagrams for switching information in the digital wrapper system in a case where trouble has occurred in a 40 G line. FIG. 12A shows a sequence diagram for the ring network L1, and FIG. 12B shows a sequence diagram for the ring network L5. FIGS. 13A and 13B show transmission and reception sequence diagrams for switching information in the OHBT system in a case where trouble has occurred in a 40 G line. FIG. 13A shows a sequence diagram for the ring network L1, and FIG. 13B shows a sequence diagram for the ring network L5. Furthermore, FIG. 14 shows the content of the switching information.

When trouble occurs in the 40 G lines F13 and F16, the trouble is detected by the reception-side node D in the case of the line F13, and the trouble is detected by the reception-side node C in the case of the line F16.

Following trouble detection, the node D judges on the basis of the ring construction information that the line F13 is a line that belongs to the ring networks L1 and L5. Similarly, the node C judges on the basis of the ring construction information that the line F16 is a line that belongs to the ring networks L1 and L5.

As a result, in both the digital wrapper system and the OHBT system, the nodes C and D judge that it is necessary to transmit switching information for performing bridging and switching according to the APS protocol on the ring networks L1 and L5 in both the ring networks L1 and L5.

However, in the digital wrapper system, as was described above, the overhead parts of the 10 G frames are accommodated and transmitted "as is" in the payload parts of the 40 G frames. Accordingly, information in the overhead parts of the 10 G frames that is to be transmitted between the nodes C and D at both ends of the lines F13 and F16 in which trouble has occurred is transmitted between the nodes C and D via the bypass path formed in the 40 G ring network L5. For this reason, transmission of the overhead parts of the 10 G frames between the nodes C and D is ensured by performing switching processing in the 40 G ring network L5 so that a bypass path is formed on the ring network L5.

On the other hand, in the OHBT system, such information in the overhead parts of 10 G frames is transmitted between the nodes C and D by a bypass path of the 40 G ring network L5.

Accordingly, in the digital wrapper system, the respective control devices 10 of the node C and node D perform control actions so that switching information in the case of trouble is transmitted only to the ring network L5, and so that switching information in the case of normal operation is transmitted to the ring network L1. In other words, in cases where trouble has occurred in lines shared by a 10 G ring network and a 40 G ring network, the control devices 10 of the node C and node D are set beforehand in the digital wrapper system so that switching information in the case of trouble is transmitted only to the 40 G ring network.

As a result, switching processing (bridging and switching) is performed only in the ring network L5. On the other hand, in the OHBT system, the control device 50 transmits switching information in the case of trouble to both ring networks L1 and L5. As a result, switching processing is performed in both the ring networks L1 and L5.

Furthermore, in regard to the recovery processing performed from time T2 on in the sequence diagram based on the digital wrapper system in FIG. 12 as well, switching processing is not performed for the ring network L1; accordingly, the transmission and reception of switching information used in normal operation is continued.

Similar processing is also performed in cases where trouble occurs in other 40 G lines.

(c) Trouble in Nodes

Figure 15A:
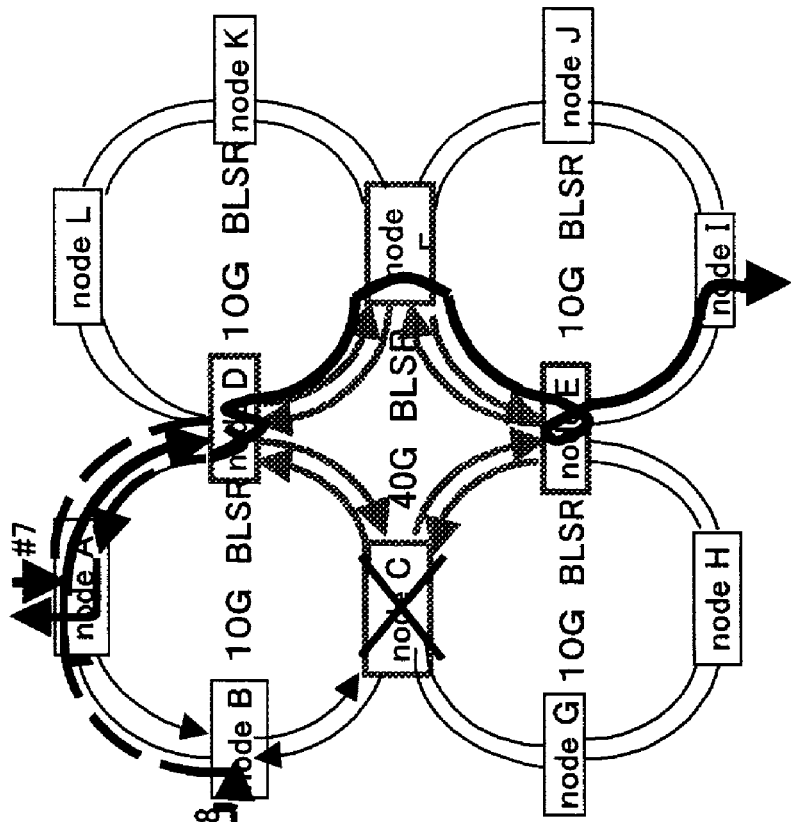
FIGS. 15A and 15B show transmission routes #1 and #2 and respective bypass routes #7 and #8 used in cases where trouble has occurred in the node C on the 40 G ring network L5 (and 10 G ring network L2)
Figure 15B:
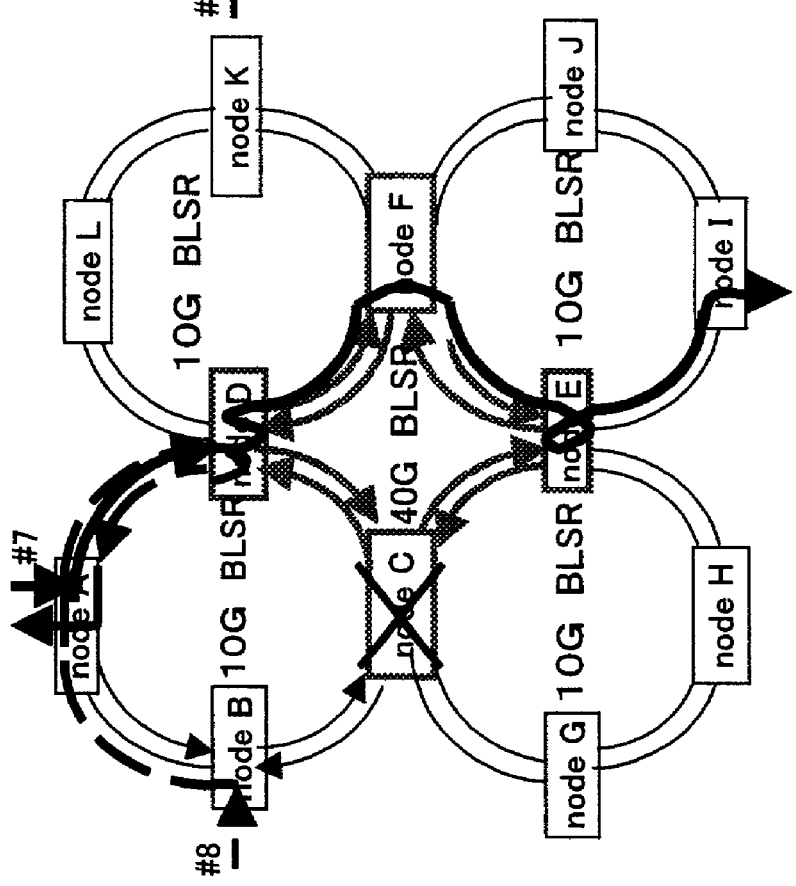

FIGS. 15A and 15B show transmission routes #1 and #2 and respective bypass routes #7 and #8 used in cases where trouble has occurred in the node C on the 40 G ring network L5 (and 10 G ring network L2). FIG. 15A shows the bypass route used in the digital wrapper system, and FIG. 15B shows the bypass route used in the OHBT system.

As is clear from FIGS. 15A and 15B, the bypass routes #7 and #8 are the same in the digital wrapper system and the OHBT system. However, the transmission and reception sequences of the switching information according to the abovementioned APS protocol which is used to form these bypass routes are different in the two systems.

Figure 16A:
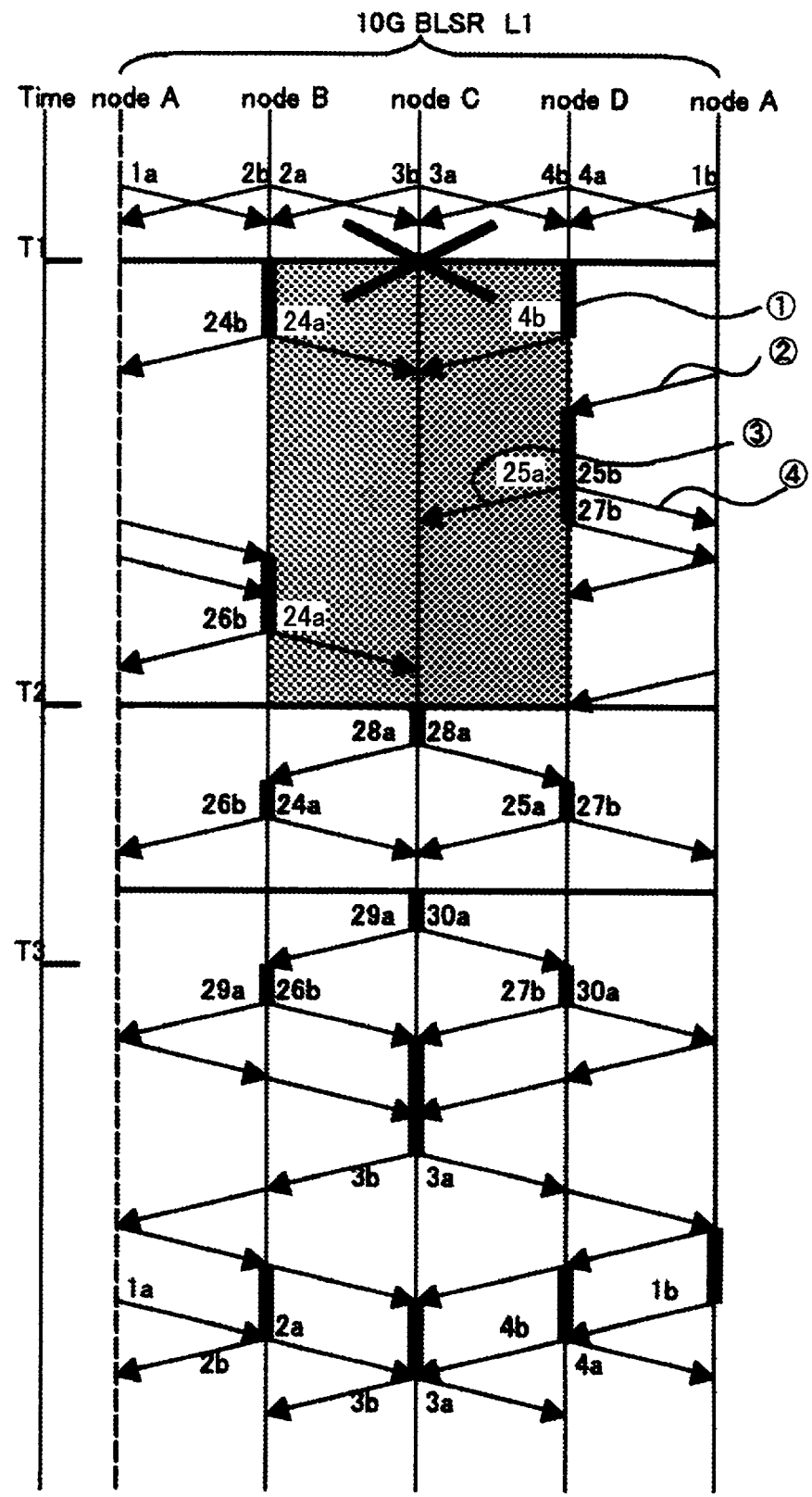
FIGS. 16A and 16B show transmission and reception sequence diagrams of switching information in the digital wrapper system used in a case where trouble has occurred in the node C.
Figure 16B:
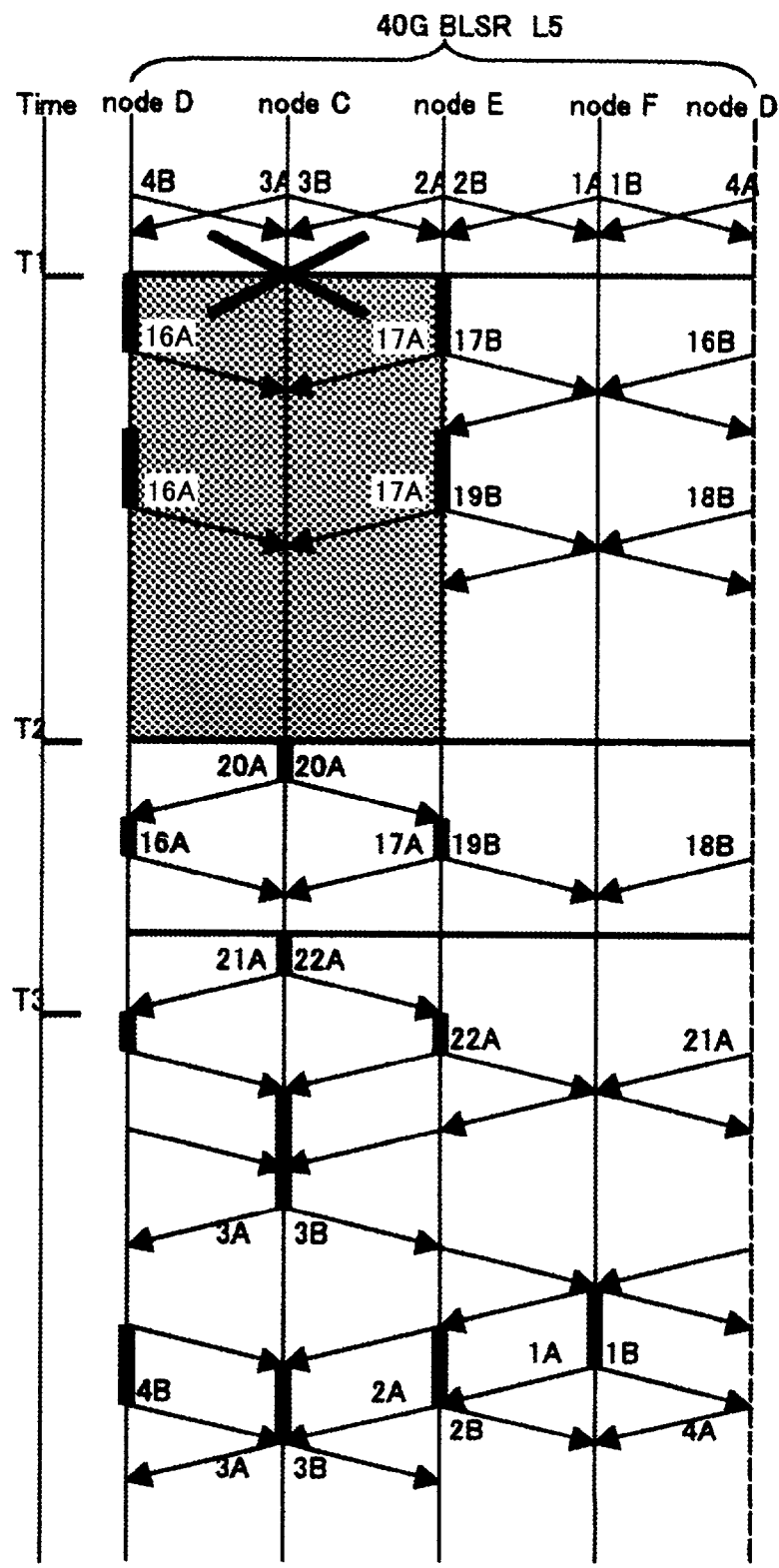
Figure 17A:
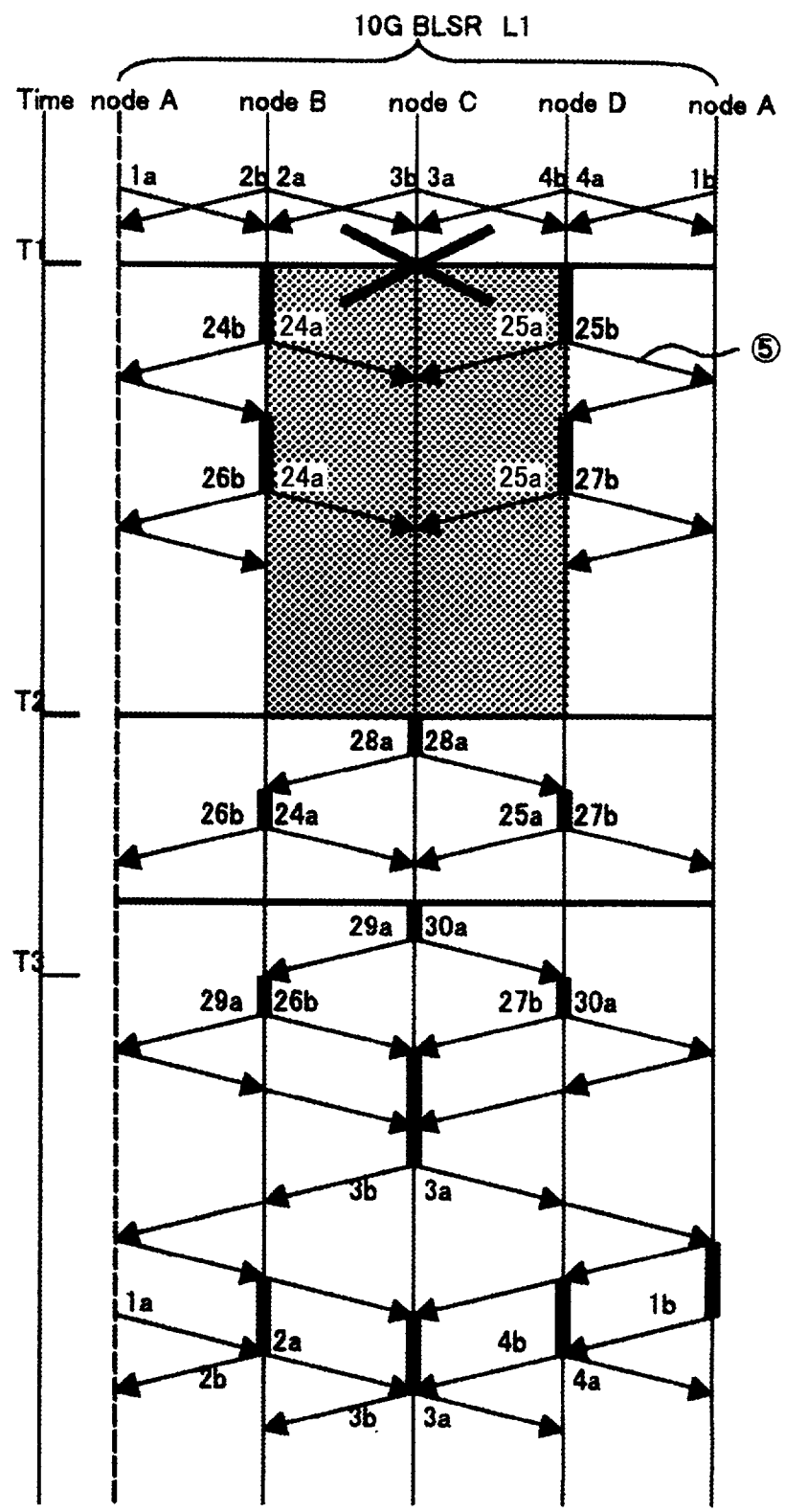
FIGS. 17A and 17B show transmission and reception sequence diagrams of switching information in the OHBT system used in a case where trouble has occurred in the node C.
Figure 17B:
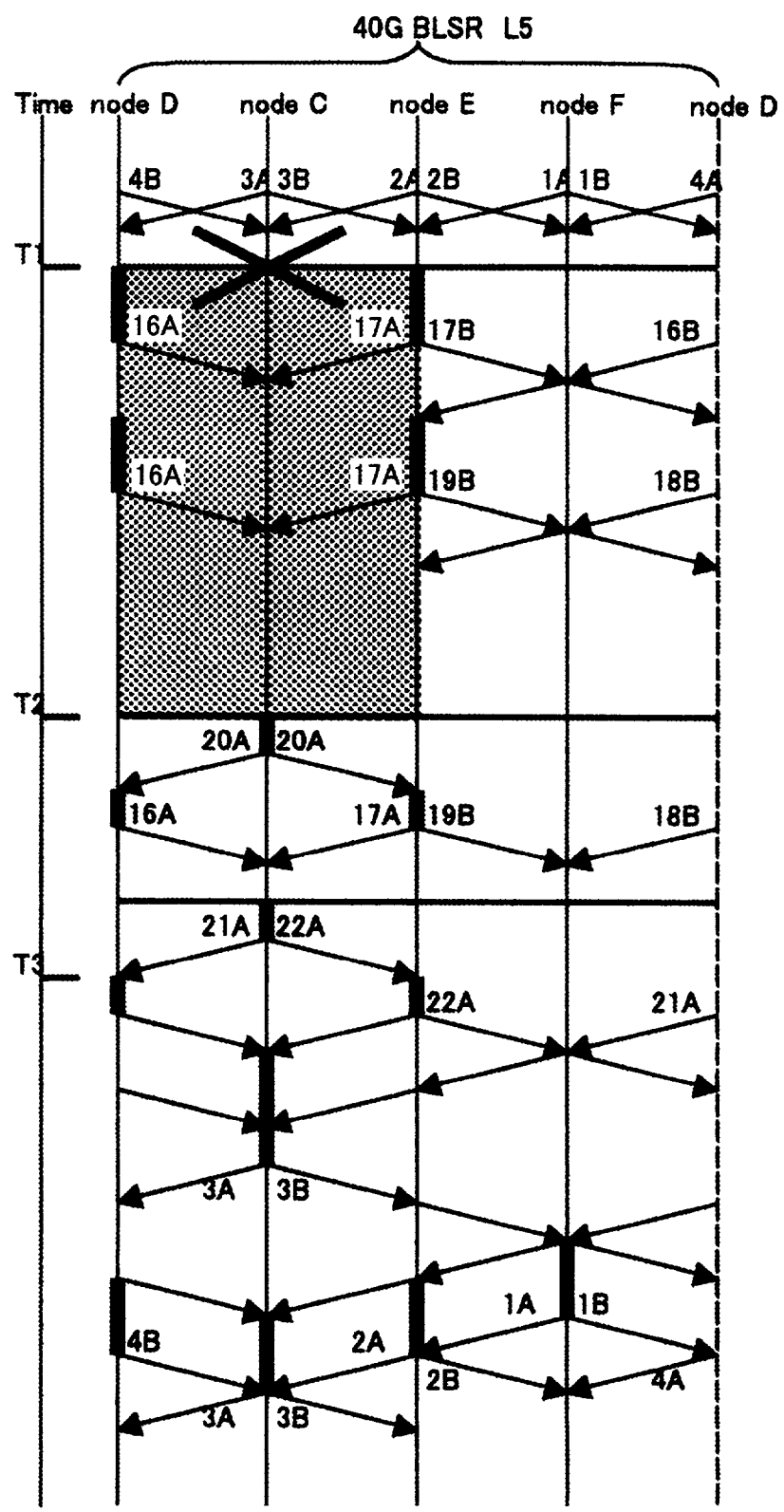

FIGS. 16A and 16B show transmission and reception sequence diagrams of switching information in the digital wrapper system used in a case where trouble has occurred in the node c. FIG. 16A shows the sequence diagram for the ring network L1, and FIG. 16B shows the sequence diagram for the ring network L5. FIGS. 17A and 17B show transmission and reception sequence diagrams of switching information in the OHBT system used in a case where trouble has occurred in the node C. FIG. 17A shows the sequence diagram for the ring network L1, and FIG. 17B shows the sequence diagram for the ring network L5. FIG. 18 shows the content of the switching information.

In a case where trouble has occurred in the node C, the resulting conditions are similar to those in cases where trouble has occurred in the 10 G lines F17 and F21 and 40 G lines F13 and F25 output from the node C. Accordingly, in the case of trouble in the 10 G line F17, the trouble is detected by the reception-side node B, and in the case of trouble in the 40 G line F13, the trouble is detected by the reception-side node D. In the case of trouble in the 40 G line F25, the trouble is detected by the reception-side node E, and in the case of trouble in the 10 G line F21, the trouble is detected by the reception-side node G.

First, the processing of the node D will be described.

In the OHBT system, when the node D detects trouble in the 40 G line F13, the node D, as with the processing of the APS protocol during trouble of the 40 G line described above, transmits switching information to both the 40 G ring network L5 and the 10 G ring network L1 so that switching processing is performed by both ring networks.

In the digital wrapper system, on the other hand, the node D performs switching processing only in the 40 G ring network L5, and does not perform switching processing in the 10 G ring network L1.

Accordingly, when the transmission and reception sequences of the switching information based on the APS protocol in the respective systems are compared (see FIGS. 16A, 16B and FIGS. 17A, 17B), it is seen that the transmission and reception sequences in the 40 G ring network L5 are the transmission and reception sequences used in the case of trouble in the two 40 G lines F13 and F25, and are the same in both systems. On the other hand, sequences in the 10 G ring network L1 are different in the two systems.

First, in the case of the OHBT system, switching processing is also performed in the ring network L1; accordingly, the transmission and reception sequence is the same as that in the ring network L5 (see FIGS. 17A and 17B).

In the digital wrapper system, on the other hand, the node D does not perform switching processing of the ring network L1 immediately after the detection of trouble. Accordingly, even if the node D detects trouble, the node D transmits switching information 4b used during normal operation to the node C (see ① in FIG. 16A), and does not transmit switching information 25a as in the OHBT system shown in FIG. 17A. Furthermore, the node D does not transmit switching information 25a (see ⑤ in FIG. 17A) to the node A as in the OHBT system.

Meanwhile, since the node B also detects trouble, the node D receives switching information 24b transmitted from the node B via the node A (see ② in FIG. 16A). As a result, the node D ascertains that switching processing of the ring network L1 is necessary, and transmits switching information 25a (③: switching required as a result of the detection of trouble by the node D) to the node C, and switching information 25b (④: switching required as a result of the detection of trouble by the node D) to the node A. Furthermore, the node D transmits a response 27b to the switching request (②) from the node B to (the node B via) the node A. Then, switching processing is also performed in the ring network L1 in accordance with the switching information transmitted by the node B.

As a result, the bypass route in the digital wrapper system and the bypass route in the OHBT system coincide.

Furthermore, "def K byte" in FIG. 18 means "default K1/K2 byte".

Furthermore, the processing is similar in cases where trouble occurs in other nodes such as node D or the like on the 40 G ring network L5. Moreover, in the case of trouble in nodes such as the nodes A, B and the like on the 10 G ring network L1 and the like, switching processing according to the APS protocol is performed only in the 10 G ring networks L1 and the like.

OTHER EMBODIMENTS

Figure 19:
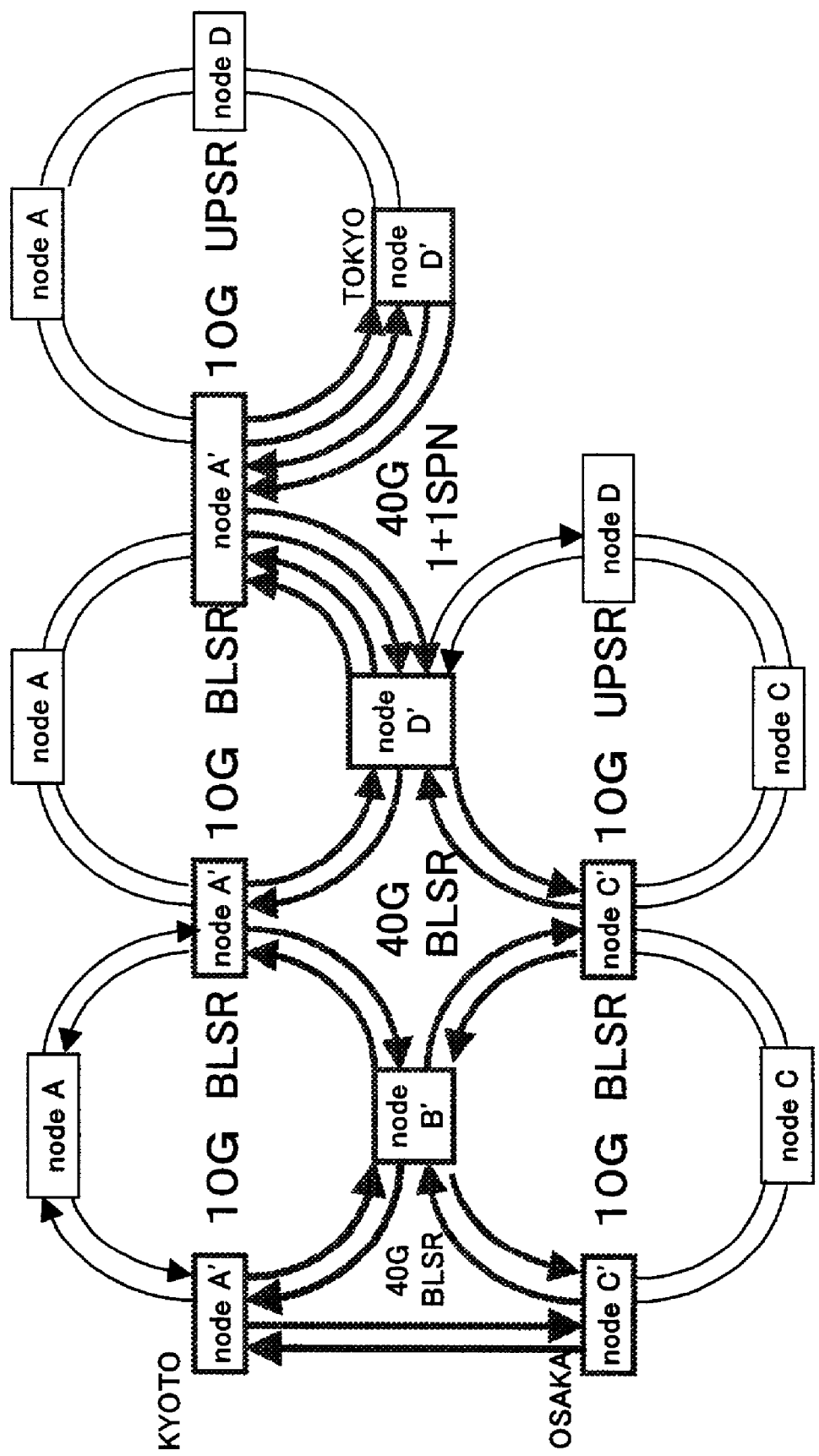
FIG. 19 shows one example of the construction of a network system in which a plurality of ring networks are connected.
Figure 20A:
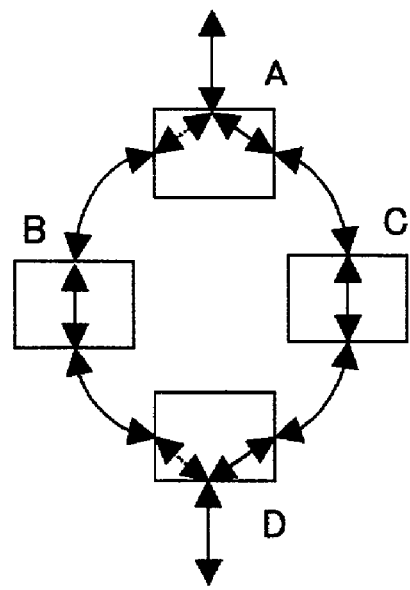
FIG. 20A is a block diagram which shows the ring network construction in a UPSR system, and the manner of data transmission in such a system.
Figure 20B:
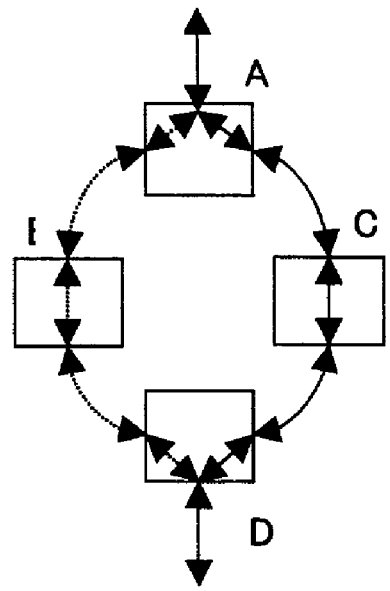
FIG. 20B is a block diagram which shows the construction of the ring network in a BLSR system, and the manner of data transmission in such a system.
Figure 21A:
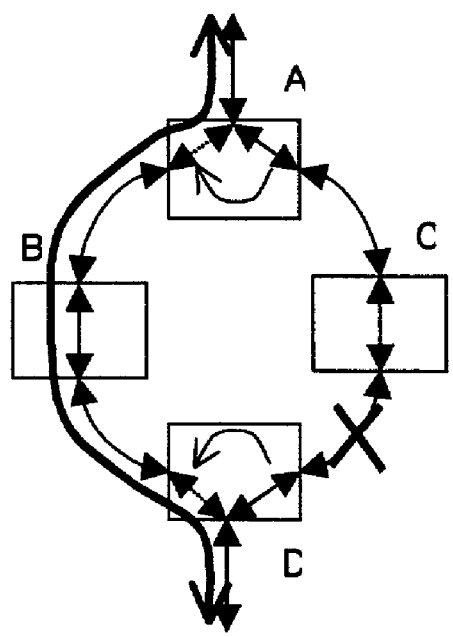
FIG. 21A shows the data transmission route used in cases where trouble occurs in the transmission line in a ring network based on the UPSR system.
Figure 21B:
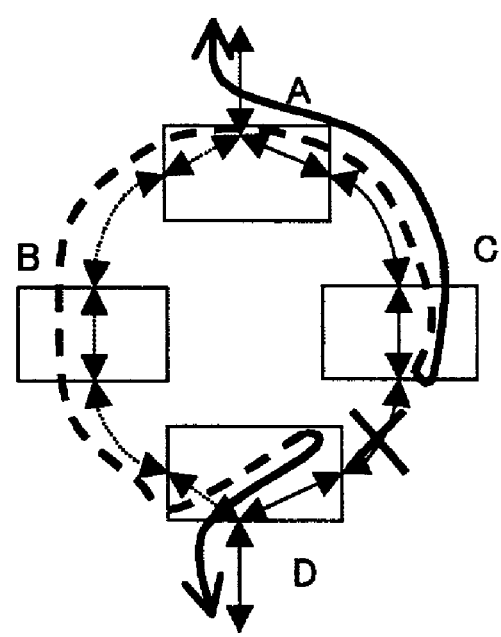
FIG. 21B shows the data transmission route used in cases where trouble occurs in the transmission line in a ring network based on the BLSR system.
Figure 22:
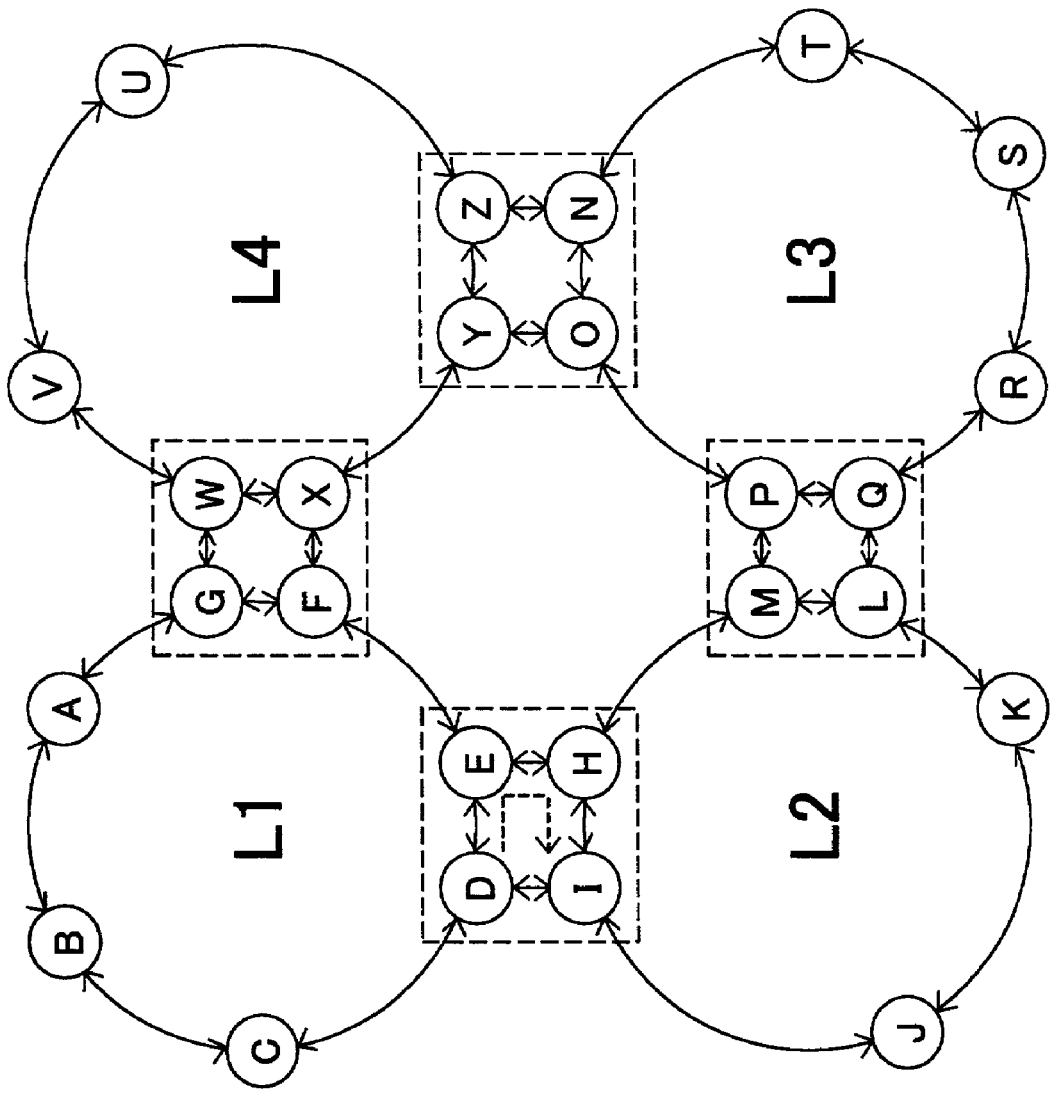
FIG. 22 is a block diagram showing the construction of a network system in which four ring networks L1 through L4 are connected.

In the embodiments described above, a network system in which four ring networks L1 through L4 were connected was used as an example. However, the present invention can also be applied to network systems in which two, three or five or more ring networks are connected. FIG. 19 shows one example of the construction of a network system in which a plurality of ring networks are connected.

Furthermore, in the embodiments described above, SONET in which frames are multiplexed in time slots was used as an example. However, the present invention can also be realized by WDM (wavelength division multiplexing) in which the respective time slots in SONET are assigned to wavelengths.

Furthermore, the present invention can also be applied in cases where the respective ring networks L1 through L5 are constructed using the UPSR system.

In the present invention, a single node device can be used as a node device connecting networks. As a result, the increase in hardware that occurs when networks are connected to each other, and the accompanying increase in cost, can be suppressed.

Furthermore, in the present invention, the convergence of traffic that accompanies the connection of a plurality of networks can be prevented, and the bandwidth of the transmission paths can be effectively utilized.

What is claimed is:

1. A node device for connecting a plurality of networks at least one of said plurality of networks having higher speed transmission lines than other transmission lines in the plurality of networks, said node device comprising:
   a plurality of input units for respectively inputting data from first transmission lines installed in each of said plurality of networks;
   a plurality of output units for respectively outputting data to second transmission lines installed in each of said plurality of networks;
   a first switching unit for switching the data input from said input units to said output units;
   a control unit transmitting switching information only via the higher speed transmission lines and at least one higher speed input unit when trouble occurs in the higher speed transmission lines shared by said plurality of networks; and
   a memory unit for storing ring construction information that indicates that said first transmission lines and said second transmission lines connect to which of said plurality of networks;
   a transmission unit for producing topology information, squelch information and switching information concerning each of said plurality of networks on the basis of said ring configuration information for each of the said corresponding networks, and transmitting said topology information, said squelch information and said switching information via said output units; and a second switching unit for performing processing including switching operations and bridging operations on the basis of said switching information, wherein the input unit that inputs data from the transmission line shared by said plurality of networks to be output to the higher speed transmission lines has a higher transmission speed than other input units.

2. The node device according to claim 1, wherein at least one of said input units has transmission speeds that differ from those of the other input units, and at least one of said output units has transmission speeds that differ from those of the other output units.

3. The node device according to claim 1, wherein the output unit that outputs data to a transmission line shared by said plurality of networks among said second transmission lines has a higher transmission speed than other output units.

4. The node device according to claim 1, said node device further comprising:

a multiplexing unit for multiplexing data by using the digital wrapper method or OHBT method, and sending this data to said output units when data is switched and output to said output units from said input units that have a transmission speed lower than that of said output units.

5. The node device according to claim 1, wherein said input units input frame data that has been multiplexed by using the digital wrapper method or OHBT method, and said node device further comprises demultiplexing units for demultiplexing said frame data input from said input units, and sending this data to said output units that have a lower transmission speed than said input units.

6. The node device according to claim 1, wherein said first and second transmission lines are formed by optical fibers, and said data is transmitted and received along said first and second transmission lines after being multiplexed by time slots or by wavelength division multiplexing in which wavelengths correspond to said time slots.

7. A node device for connecting a plurality of networks, at least one of said plurality of networks having higher speed transmission lines than other transmission lines in the plurality of networks, said node device comprising:

a plurality of input units for respectively inputting data from first transmission lines installed in each of said plurality of networks;

a plurality of output units for respectively outputting data to second transmission lines installed in each of said plurality of networks;

a first switching unit for switching the data input from said input units to said output units; and a control unit transmitting switching information only via the higher speed transmission lines and at least one higher speed input unit when trouble has occurred in said higher speed transmission lines shared by said plurality of networks;

a detection unit for detecting trouble in said first transmission lines; and a judgment unit for judging whether or not switching information is to be transmitted by said transmission unit to all of the networks to which said shared transmission line is connected, or to one of the networks among said networks when said detection unit detects trouble in said shared transmission line, wherein the input unit that inputs data from the transmission line shared by said plurality of networks to be output to the higher speed transmission lines has a higher transmission speed than other input units.

8. A network system comprising:

a first network in which a plurality of first node devices are connected by transmission lines;

a second network in which a plurality of second node devices are connected by transmission lines; and a third node device which is connected to some of the transmission lines of said first network and some of the transmission lines of said second network, said third node device transmitting and receiving the data transmitted and received by at least one of said transmission lines connected to said third node device at a higher speed than the data transmitted and received by the other transmission lines of said first network and transmission lines of said second network, wherein said third node device further comprises:

a control unit transmitting switching information only via the higher speed transmission lines in which no fault occurred when trouble occurs in the higher speed transmission lines connected to said third node device.

9. The network system according to claim 8, wherein at least two of said third node devices are disposed adjacent to each other, and the data that is transmitted and received by said transmission lines between said at least two of said third nodes devices is transmitted and received at a higher speed than the data that is transmitted and received by the other transmission lines of said first network and transmission lines of said second network.

* * * * *